(12) United States Patent
Kim et al.

(10) Patent No.: US 11,493,966 B2
(45) Date of Patent: Nov. 8, 2022

(54) ELECTRONIC DEVICE INCLUDING HINGE STRUCTURE

(71) Applicant: Samsung Electronics Co., Ltd., Gyeonggi-do (KR)

(72) Inventors: Jong-Yoon Kim, Gyeonggi-do (KR); Chung-Keun Yoo, Gyeonggi-do (KR); Yong-Hwa Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 16/758,460

(22) PCT Filed: Aug. 7, 2018

(86) PCT No.: PCT/KR2018/008943
§ 371 (c)(1),
(2) Date: Apr. 23, 2020

(87) PCT Pub. No.: WO2019/107701
PCT Pub. Date: Jun. 6, 2019

(65) Prior Publication Data
US 2021/0373609 A1  Dec. 2, 2021

(30) Foreign Application Priority Data
Dec. 1, 2017  (KR) .................. 10-2017-0164291

(51) Int. Cl.
*G06F 1/16* (2006.01)
*H04M 1/02* (2006.01)
*F16M 11/10* (2006.01)

(52) U.S. Cl.
CPC ............ *G06F 1/1681* (2013.01); *G06F 1/166* (2013.01); *H04M 1/022* (2013.01); *F16M 11/10* (2013.01); *G06F 1/1626* (2013.01)

(58) Field of Classification Search
CPC .... G06F 1/1681; G06F 1/1616; G06F 1/1641; G06F 1/1652; G06F 1/166; H04M 1/022; H04M 1/0268; F16M 11/10; H05K 5/0226
See application file for complete search history.

(56) References Cited

U.S. PATENT DOCUMENTS 9,677,308 B1 *  6/2017  Chen ..................... G06F 1/1681
9,759,242 B2 *  9/2017  Hsu ........................... G06F 1/16
(Continued)

FOREIGN PATENT DOCUMENTS

KR   10-2012-0049762 A   5/2012
KR   10-2012-0094453 A   8/2012
(Continued)

OTHER PUBLICATIONS

European Search Report dated Sep. 21, 2020.
Decision of Grant dated Apr. 22, 2022.

*Primary Examiner* — Nidhi Thaker
(74) *Attorney, Agent, or Firm* — Cha & Reiter, LLC

(57) ABSTRACT

An electronic device according to various embodiments of the present invention comprises: a housing including a front surface and a rear surface facing the direction opposite to the front surface; a support plate rotatably coupled to the rear surface of the housing, and rotating around a first axis from a position in which the support plate is in close contact with a partial area of the rear surface to an open state in which the support plate forms an angle with respect to the rear surface; and a hinge structure having at least a portion accommodated inside the housing, and rotatably coupling the support plate to the housing. Therein, the hinge structure can comprise: a first guide member mounted on and fixed to the inner side surface of the housing; a second guide member mounted on and fixed to one surface of the support plate; and a gear module for linking the first guide member and the (Continued)

second guide member, wherein the first axis can be positioned on the rear surface on the outside of the housing. The electronic device can vary according to embodiments.

15 Claims, 15 Drawing Sheets

(56) References Cited

U.S. PATENT DOCUMENTS

| | | | |
|---|---|---|---|
| 9,834,965 | B1 | 12/2017 | Yao et al. |
| 9,856,909 | B1* | 1/2018 | Hsu ..................... G06F 1/1681 |
| 9,879,715 | B1* | 1/2018 | Hsu ..................... E05D 7/00 |
| 10,001,815 | B1* | 6/2018 | Yao ..................... H05K 5/0234 |
| 10,775,852 | B2* | 9/2020 | Kim ..................... G06F 1/1641 |
| 2011/0310548 | A1 | 12/2011 | Ahn et al. |
| 2014/0293534 | A1 | 10/2014 | Siddiqui |
| 2016/0097227 | A1 | 4/2016 | Hsu |
| 2017/0199550 | A1 | 7/2017 | Senatori et al. |
| 2018/0113491 | A1* | 4/2018 | Park ..................... G06F 1/166 |
| 2018/0239399 | A1* | 8/2018 | Nakada ............... G06F 1/1626 |

FOREIGN PATENT DOCUMENTS

| | | |
|---|---|---|
| KR | 10-2013-0065979 A | 6/2013 |
| KR | 10-2015-0135666 A | 12/2015 |
| KR | 10-2016-0133596 A | 11/2016 |
| KR | 10-2017-0047711 A | 5/2017 |
| TW | M538309 U | 3/2017 |
| TW | M538310 U | 3/2017 |

* cited by examiner

ELECTRONIC DEVICE INCLUDING HINGE STRUCTURE

CROSS-REFERENCE TO RELATED APPLICATION(S)

This application is a National Phase Entry under 35 U.S.C. § 371 of PCT International Application No. PCT/KR2018/008943, which was filed on Aug. 7, 2018, and claims priority to Korean Patent Application No. 10-2017-0164291, which was filed in the Korean Intellectual Property Office on Dec. 1, 2017, the entire contents of each of which are incorporated herein by reference.

TECHNICAL FIELD

Various embodiments relate to an electronic device. For example, various embodiments relate to an electronic device including a hinge structure.

BACKGROUND ART

Typically, an electronic device may mean a device that performs a specific function according to a program provided therein (e.g., an electronic scheduler, a portable multimedia reproducer, a mobile communication terminal, a tablet PC, an image/sound device, a desktop/laptop PC, or a vehicle navigation system) as well as a home appliance. As the integration degree of electronic devices has increased and super-high speed and large capacity wireless communication has become popular, various functions have recently been provided in a single electronic device, such as a mobile communication terminal. For example, various functions, such as an entertainment function (e.g., a game function), a multimedia function (e.g., a music/video reproducing function), a communication and security function for mobile banking, a schedule management function, and an e-wallet function, are integrated in a single electronic device, in addition to a communication function.

Recently, an electronic device has emerged in the form in which the portability of a mobile communication terminal is combined with the expandability of a laptop computer. For example, the electronic device has an external appearance in the form of a tablet PC, which is easy to carry like a mobile communication terminal, and includes a display device having considerable performance and a sufficient size, whereby the electronic device is capable of being usefully utilized in an industrial field or as an office computer by being combined with an additional device such as a keyboard. In a portable state, a user generally holds the electronic device directly in his/her hand, and while the user is watching a video or in the state in which the electronic device is coupled with an additional device, the user may use the electronic device in the state of being cradled on a desk or the like.

In order to use an electronic device such as a tablet PC in the cradled state, a separate cradle or the like is required. However, since the cradle or the like lowers portability, the electronic device itself may include a cradle such as a support plate.

DETAILED DESCRIPTION OF THE INVENTION

Technical Problem

In the portable state, the support plate is maintained in the state of being accommodated in or in close contact with the housing of the electronic device. When the electronic device is cradled, the electronic device may be cradled on a flat face such as a desk in the state in which the support plate protrudes from the housing or is disposed to form an angle with the housing.

However, there may be a limit in stably maintaining the accommodated state or close contact state of the support plate, and in stably maintaining an inclination angle of the support plate with respect to the housing even in the cradling state. For example, the support plate may protrude from the housing regardless of the user's intention, or it may be difficult to maintain the stable cradling state when the support force of the support plate is weak in the state of being cradled on the flat face.

Various embodiments of the disclosure may provide an electronic device in which the accommodated state (or close contact state) and the cradling state of the support plate are capable of being stably maintained.

Various embodiment of the disclosure may provide an electronic device including a hinge structure, which couples the support plate to the housing and is concealed by the housing or the like.

Various embodiments of the disclosure may provide an electronic device capable of stably maintaining a stationary state while generating a friction force (a kinetic friction force or a static friction force) so as to provide an improved operation feeling in pivoting the support plate.

Technical Solution

According to various embodiments of the disclosure, an electronic device may include: a housing structure including a front face and a rear face facing away from the front face; a plate including a first face and a second face facing away from the first face and configured to be pivotally movable around a first axis between a closed state and an open state with respect to the rear face, the second face facing at least a partial region of the rear face in the closed state, and the second face forming an angle with at least the partial region of the rear face in the open state; and a hinge structure configured to pivotally couple the plate to the housing. According to an embodiment, the hinge structure may include: a first shaft including a first straight-toothed spur gear rotatable around a second axis parallel to the first axis; a second shaft including a second straight-toothed spur gear rotatable around a third axis parallel to the first axis; a third straight-toothed spur gear rotatable in engagement with the first spur gear; a fourth straight-toothed spur gear rotatable in engagement with the third spur gear and the second spur gear; a first guide structure fixed to the housing structure, the first guide structure including a first curved opening including a first straight-toothed inner gear; and a second guide structure fixed to the plate, the second guide structure including a second curved opening including a second straight-toothed inner gear. The first inner gear may be engaged with the first spur gear, but may not be engaged with the second spur gear, the third spur gear, and the fourth spur gear, the second inner gear may be engaged with the second spur gear, but may not be engaged with the first spur gear, the third spur gear, and the fourth spur gear, and each of the first guide structure and the second guide structure may be rotatable around the first axis.

According to various embodiments of the disclosure, the electronic device may include: a housing including a front face and a rear face facing away from the front face; a support plate pivotably coupled to the rear face of the housing, the support plate being pivoted around a first axis and opened to form an angle with respect to the rear face from a position in close contact with a partial region of the rear face; and a hinge structure at least partially accommodated in the housing, and configured to pivotably couple the support plate to the housing. The hinge structure may include: a first guide member mounted and fixed to an inner face of the housing; a second guide member mounted and fixed to a face of the support plate; and a gear module configured to interconnect the first guide member and the second guide member, and the first axis may be located on the rear face outside the housing.

Advantageous Effects

According to various embodiments of the disclosure, the hinge structure is capable of stably maintaining the pivot of the support plate by including a plurality of gears or gear modules. In addition, by generating a frictional force between gears or a frictional force generated by an additionally provided spring washer or the like, it is possible to stably maintain the accommodated state (or close contact state) and the cradling state of the support plate. According to various embodiments, the pivot of the support plate is performed by the relative movement between the guide members constituting the hinge structure, and the axis as the pivot center of the support plate may be located substantially outside the hinge structure. For example, the hinge structure may be installed in a concealed state inside the electronic device (or the housing of the electronic device), thereby making the external appearance of the electronic device beautiful.

MODE FOR CARRYING OUT THE INVENTION

Figure 1:
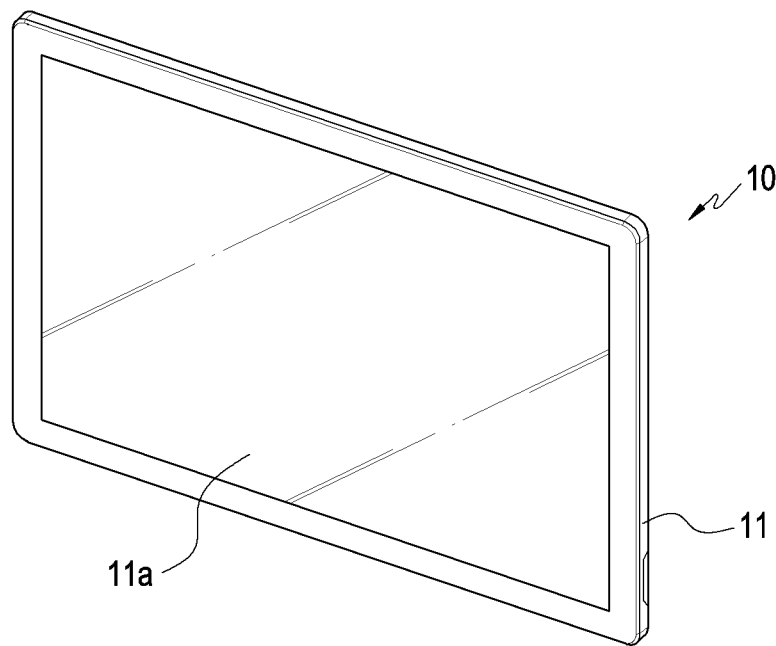
FIG. 1 is a perspective view illustrating an electronic device according to various embodiments of the disclosure.

As the disclosure allows for various changes and numerous embodiments, some exemplary embodiments will be described in detail with reference to the accompanying drawings. However, it should be understood that the disclosure is not limited to the specific embodiments, but the disclosure includes all modifications, equivalents, and alternatives within the spirit and the scope of the disclosure.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as "first" and "second". In the ordinal numbers such as "first" and "second", their order are determined in the mentioned order or arbitrarily and may not be arbitrarily changed if necessary.

In the disclosure, the terms are used to describe specific embodiments, and are not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the specification.

In the disclosure, an electronic device may be a random device including a touch panel, and the electronic device may be called a terminal, a portable terminal, a mobile terminal, a communication terminal, a portable communication terminal, a portable mobile terminal, a display device or the like.

For example, the electronic device may be a smartphone, a portable phone, a navigation device, a game player, a TV, a heads-up display unit for a vehicle, a notebook computer, a laptop computer, a tablet Personal Computer (PC), a personal media player (PMP), a personal digital assistants (PDA), or the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless local area network (WLAN), a wide area network (WAN), the Internet, a small area network (SAN) or the like, but is not limited thereto.

Figure 2:
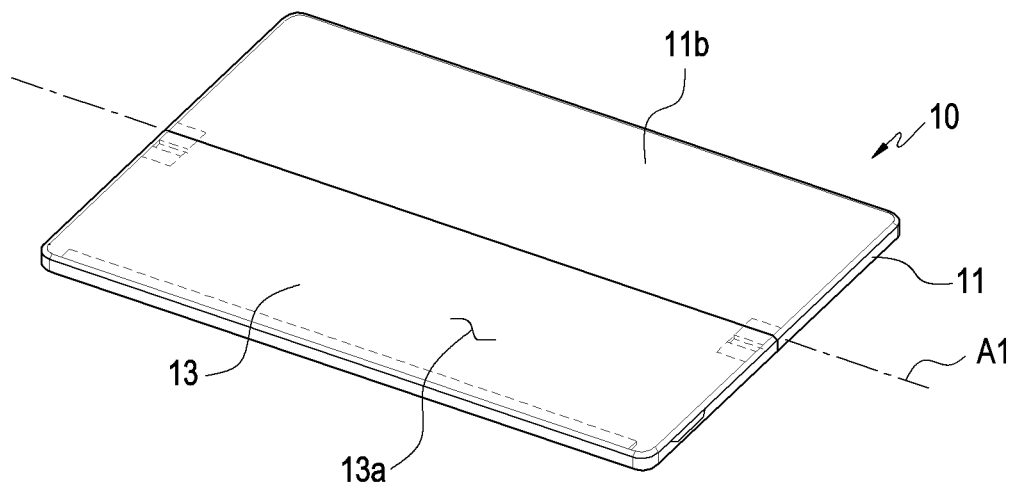
FIG. 2 is a perspective view illustrating a state in which a support plate of the electronic device according to various embodiments of the disclosure is closed.
Figure 3:
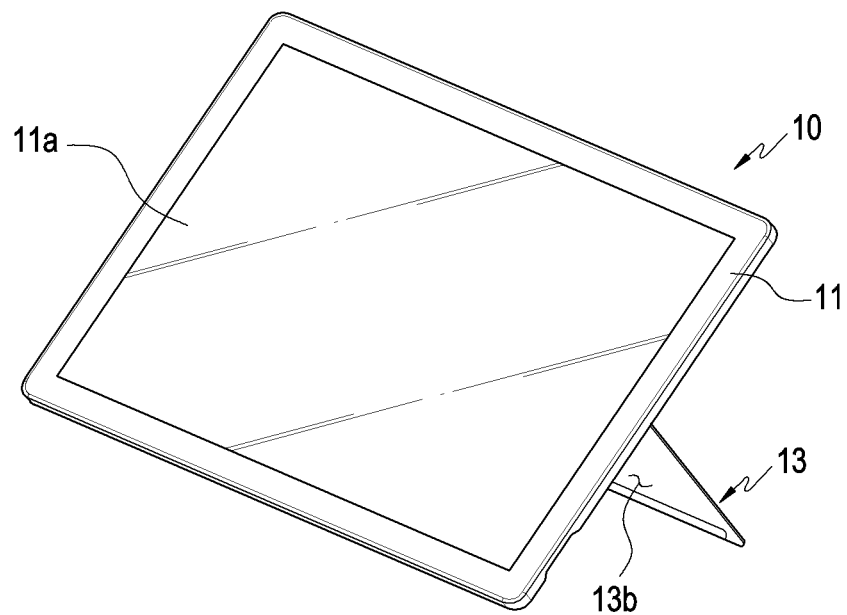
FIG. 3 is a perspective view illustrating a state in which the electronic device according to various embodiments of the disclosure is cradled.
Figure 4:
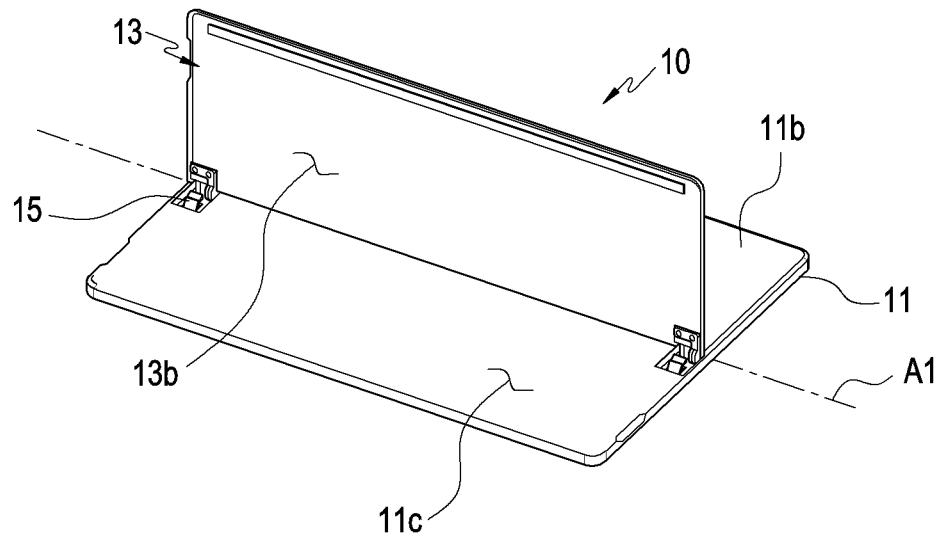
FIG. 4 is a perspective view illustrating a state in which the support plate of the electronic device according to various embodiments of the disclosure is opened.
Figure 5:
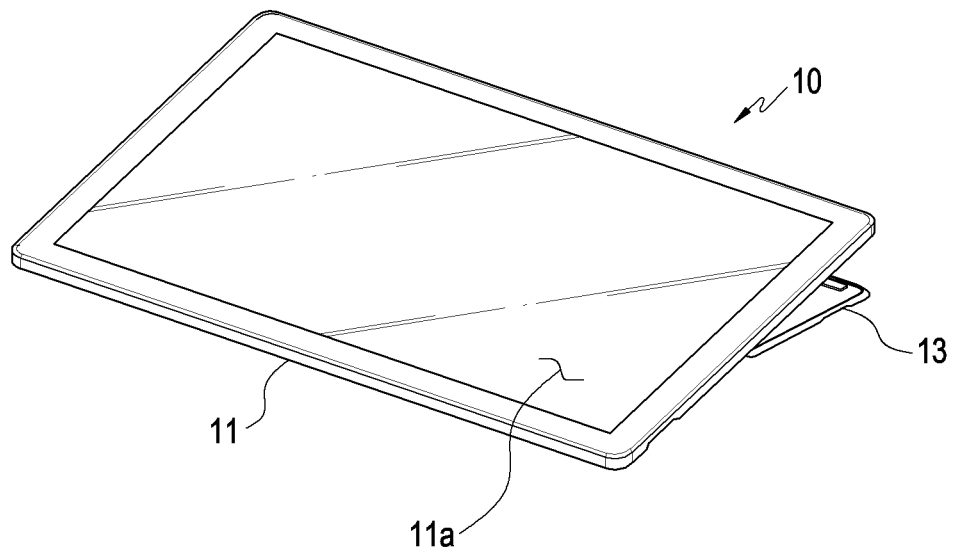
FIG. 5 is a perspective view illustrating another state in which the support plate of the electronic device according to various embodiments of the disclosure is opened.

FIG. 1 is a perspective illustrating an electronic device 10 according to various embodiments of the disclosure. FIG. 2 is a perspective view illustrating a state in which a support plate 13 of the electronic device 10 according to various embodiments of the disclosure is closed. FIG. 3 is a perspective view illustrating a state in which the electronic device 10 according to the first one of various embodiments of the disclosure is cradled. FIG. 4 is a perspective view illustrating a state in which the support plate 13 of the electronic device 10 according to various embodiments of the disclosure is opened. FIG. 5 is a perspective view illustrating another state in which the support plate 13 of the electronic device 10 according to various embodiments of the disclosure is opened.

Referring to FIGS. 1 to 5, the electronic device 10 may include a housing structure (e.g., the housing 11), a plate (e.g., the support plate 13), and/or hinge structures (e.g., the hinge structures 15) that pivotably couples the support plate 13 to the housing 11.

According to various embodiments, the housing 11 may include a front face 11a and a rear surface 11b facing away from the front face 11a, and may house therein a display that outputs a screen through the front face 11a. According to an embodiment, the front face 11a may be formed of a glass plate or a polymer plate including various coating layers, and the rear face 11b may be formed of coated or colored glass, ceramic, polymer, metal, or a combination of at least two of the above-mentioned materials.

According to an embodiment, a display, an audio module, a sensor module, a camera module, a key, a touch input device, an indicator, or the like may be disposed in the space between the front face 11a and the rear face 11b. According to another embodiment, electronic components or the like disposed in the space between the front face 11a and the rear face 11b may be exposed to the outside of the housing 11. In some embodiments, the housing 11 may provide means for connecting to an external device (e.g., a charger, a personal computer, an ear-microphone, and an imaging device) by including various connectors. In another embodiment, the housing 11 may include an antenna device, and at least a portion of the antenna device may be formed by a portion of the housing 11.

According to various embodiments, a partial region of the rear face 11b may be formed to be lower than the other region of the rear face 11b. Hereinafter, the partial region will be referred to as a "seating face 11c" for the sake of concise description. However, this does not mean that the rear face 11b and the seating face 11c are independent structures with respect to each other, and the seating face 11c may be substantially a partial region of the rear face 11b. According to various embodiments, the seating face 11c may be formed in an area of about half of the rear face 11b. According to an embodiment, the hinge structure 15 may be partially exposed in the seating face 11c while being mounted inside the housing 11. The hinge structures 15 may be mounted at opposite edges of the housing 11 in the central portion between the upper end and the lower end of the housing 11 (e.g., the upper end and the lower end of the electronic device 10 illustrated in FIG. 1), and may form a first axis A1 (e.g., a pivot axis of a support plate to be described later) located substantially at the center of the housing 11.

According to various embodiments, the opposite side ends of the upper end side of the support plate 13 may be mounted and fixed to the hinge structures 15, respectively. For example, the support plate 13 may be pivotably coupled to the housing 11 by the hinge structures 15. According to an embodiment, the support plate 13 may include a first face 13a and a second face 13b facing away from the first face 13a, and the second face 13b may pivot about the pivot axis (e.g., the first axis A1) from a position where the second face 13b faces a partial region of the rear face 11b (e.g., the seating face 11c) or a closed state (e.g., a position where the second face is in close contact with the seating face 11c). For example, the support plate 13 may be closed in the state in which the second face 13b faces the seating face 11c, and may be in the open state to form an angle with respect to the housing 11 or the rear face 11b by pivoting about the first axis A1.

In an embodiment, when the angle of the support plate 13 in the state in which the support plate 13 is in close contact with the seating face 11c (closed state) is defined as 0 degree, the support plate 13 is pivotable with respect to the rear face 11b in the range of less than 180 degrees. For example, the support plate 13 may be opened up to an angle of approximately 170 degrees or 175 degrees from the closed position. In another embodiment, the support plate 13 may remain stationary at any angular position (or a tilt angle desired by the user) within an angle range in which the support 13 is pivotable. For example, the hinge structures 15 are capable of keeping the tilt angle (or the opened angle) of the support plate 13 constant unless the user manipulates the hinge structures 15.

In some embodiments, a protective rib (not illustrated) may be formed at an edge of the seating face 11c, and the seating face 11c may take a form of a recess having a depth substantially corresponding to the thickness of the support plate 13. For example, in the close contact state, the support plate 13 may be substantially accommodated in the seating face 11c, and when the support plate 13 is accommodated in the seating face 11c, the support plate 13 may be concealed when viewed from a side of the housing 11. However, a space for manipulating the support plate 13 to allow the user to pivot the support plate 13 (for example, to move away from the seating face) may be provided, and even in the state in which the support plate 13 is accommodated in the seating face 11c through the space, a portion (e.g., a portion of an edge) of the support plate 13 may be exposed to the outside of the electronic device 10 (e.g., a side face of the housing 11). In the following detailed description, descriptions such as "get away" or "move away" may mean that the support plate 13 is pivoted so as to move to a position forming an angle with respect to the seating face 11c.

Figure 6:
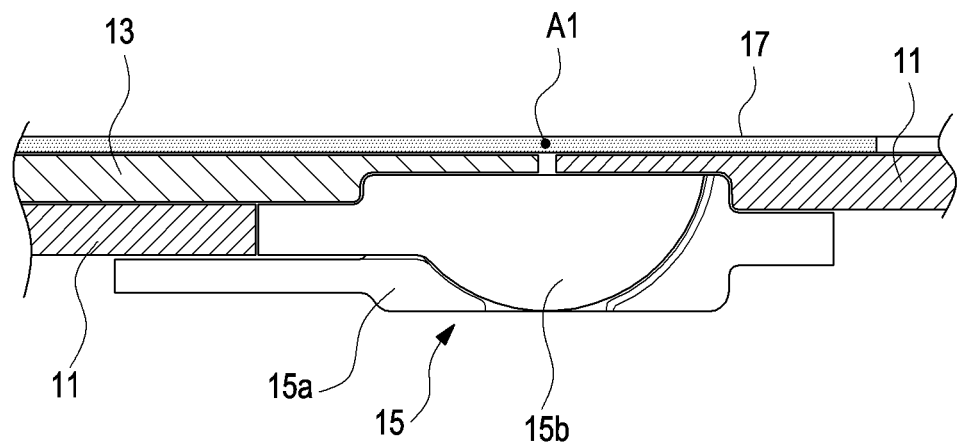
FIG. 6 is a cross-sectional view illustrating a configuration for describing a state in which the support plate is coupled to a housing in the electronic device according to various embodiments of the disclosure.

FIG. 6 is a cross-sectional view illustrating a configuration for describing a state in which the support plate 13 is coupled to the housing 11 in the electronic device 10 according to various embodiments of the disclosure.

Further referring to FIG. 6, the first axis A1 may be located outside of the housing 11 or outside of the hinge structures 15. In some embodiments, the electronic device 10 may further include a flexible layer 17, and the first axis A1 may be formed in the flexible layer 17. In FIGS. 1 to 5, it is noted that the flexible layer 17 is omitted to show the arrangement of the support plate 13 and the like.

According to various embodiments, the flexible layer 17 may be made of leather, artificial leather, fabric, or synthetic resin such as urethane, and may be deformed by an external force, its own weight, or the like. In an embodiment, a portion the flexible layer 17 may be attached to the first face 13a, for example, the outer face of the support plate 13, and the remaining portion may be attached to the remaining region of the rear face 11b. Here, the wording "remaining region of the rear face 11b" may mean a region excluding the seating face 11c from the rear face 11b.

According to an embodiment, in a state of being in close contact with the seating face 11c, the support plate 13 may be arranged such that the first face 13a is substantially coplanar with the remaining area of the rear face 11b. For example, when the support plate 13 is in close contact with the seating face 11c, the support plate 13 may be seen as a portion of the housing 11 in external appearance, and the first face 13a of the support plate 13 may be seen as a portion of the rear face 11b. In another embodiment, a portion of the flexible layer 17 may be attached to the first face 13a, and the remaining portion may be attached to a region beyond the seating face 11c on the rear face 11b. For example, on the rear face of the electronic device 10, an edge of the support plate 13 positioned on the rear face 11b, for example, a parting line between the remaining region of the rear face 11b and the support plate 13 may be concealed by the flexible layer 17.

In some embodiments, the support plate 13 (e.g., the first face 13a) may be positioned at a predetermined distance from the remaining region of the rear face 11b. For example, the support plate 13 (e.g., the first face 13a) may pivot while maintaining the state of being spaced apart from the remaining region of the rear face 11b so as to form an angle with respect to the rear face 11b. In this case, a portion of the flexible layer 17 may not be attached to the support plate 13 or the remaining region of the rear face 11b. For example, between the support plate 13 (e.g., the first face 13a) and the remaining region of the rear face 11b, the flexible layer 17 may include a region that is not attached to the support plate 13 (e.g., the first face 13a) and the remaining region of the rear face 11b.

According to various embodiments, the hinge structure 15 may include a first guide structure (e.g., a first guide member 15a) mounted and fixed to the housing 11 and a second guide structure (e.g., a second guide member 15b) mounted and fixed to the support plate 13, and a gear module (not illustrated) (e.g., a gear module 103 in FIG. 7 or FIG. 10) may couple the first guide member 15a and the second guide member 15b in a movable state with respect to each other. The first guide member 15a may be mounted and fixed to the inner face of the housing 11, and may be disposed to partially enclose the second guide member 15b. In some embodiments, the second guide member 15b may be mounted on the housing 11 depending on the actual shapes of the housing 11 and the support plate 13 (e.g., the external appearance of an actual product). The second guide member 15b may rotate or circle around the first axis A1 following the guide of the first guide member 15a, and may be exposed on the seating face 11c so as to be coupled to the support plate 13. As described above, the first shaft A1 may be formed outside the housing 11, for example, at a position spaced apart from the rear face 11b. In another embodiment, the first axis A1 is provided as a pivot axis of the support plate 13, and may be spaced apart from the first face 13a or the second face 13b of the support plate 13. For example, the first axis A1 is located outside the housing 11, the support plate 13, or the hinge structure 15, and provides a pivot axis of the support plate 13. The first axis A1 may be located in the flexible layer 17.

The flexible layer 17 described above is attached to a region that may be substantially in direct contact with the user during use or carrying, and may provide a soft touch to the user. In another embodiment, the support plate 13 is mounted on the rear face of the housing 11 and forms a parting line, but the flexible layer 17 may be attached to the support plate 13 so as to conceal the parting line. By printing and marking various decorative patterns or the like on the flexible layer 17, it is possible to make the external appearance beautiful.

Hereinafter, the configuration of the hinge structure 15 will be described in more detail.

Figure 7:
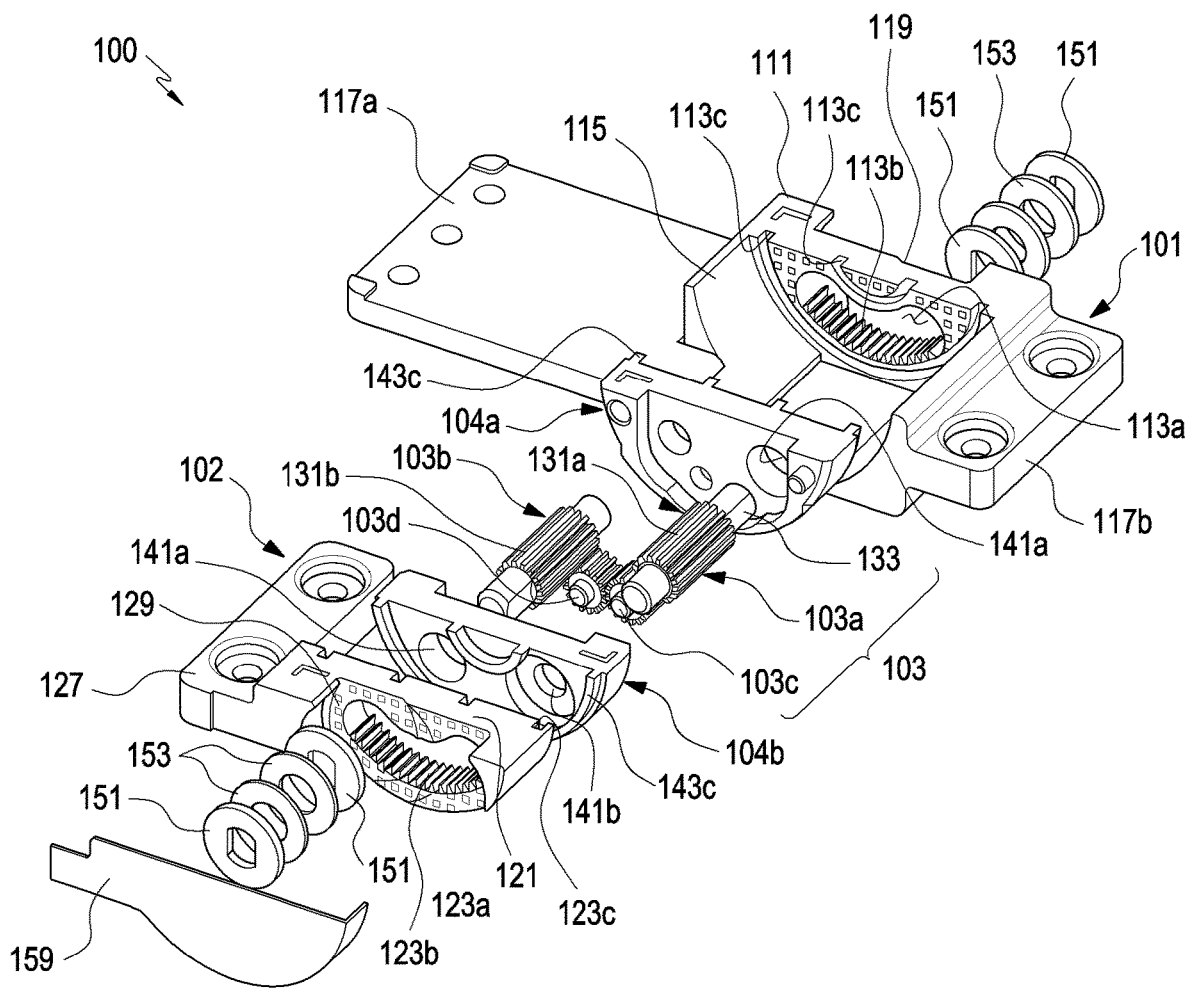
FIG. 7 is an exploded perspective view illustrating a hinge structure in an electronic device according to various embodiments of the disclosure.
Figure 8:
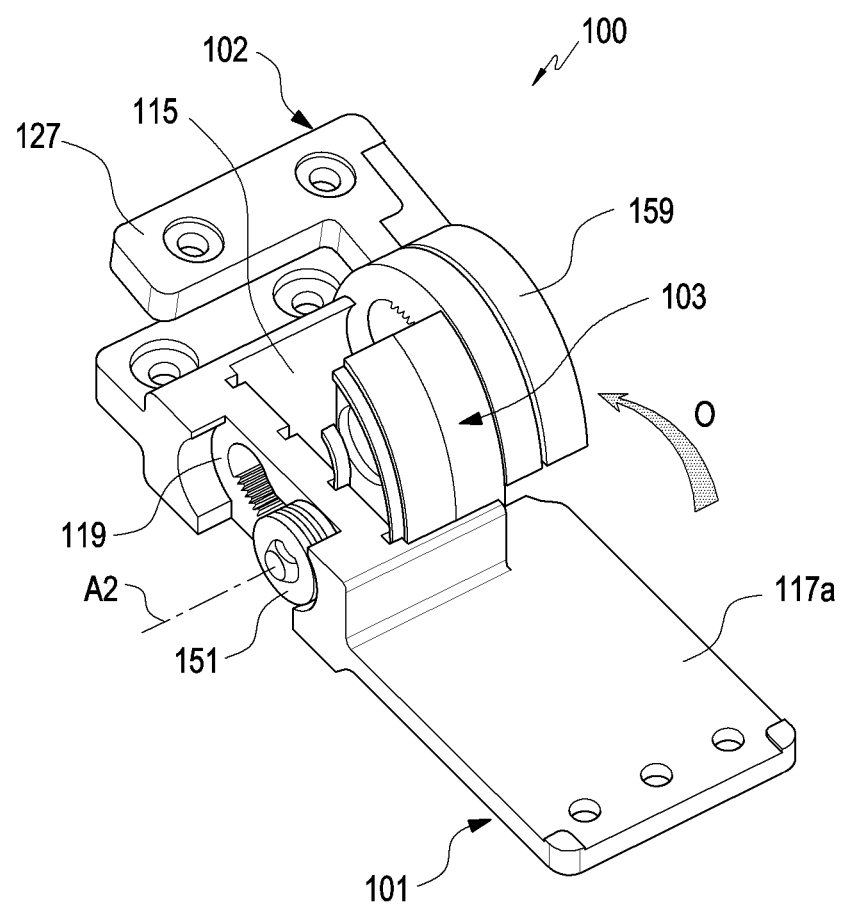
FIG. 8 is a perspective view illustrating the hinge structure according to various embodiments of the disclosure in the assembled state.
Figure 9:
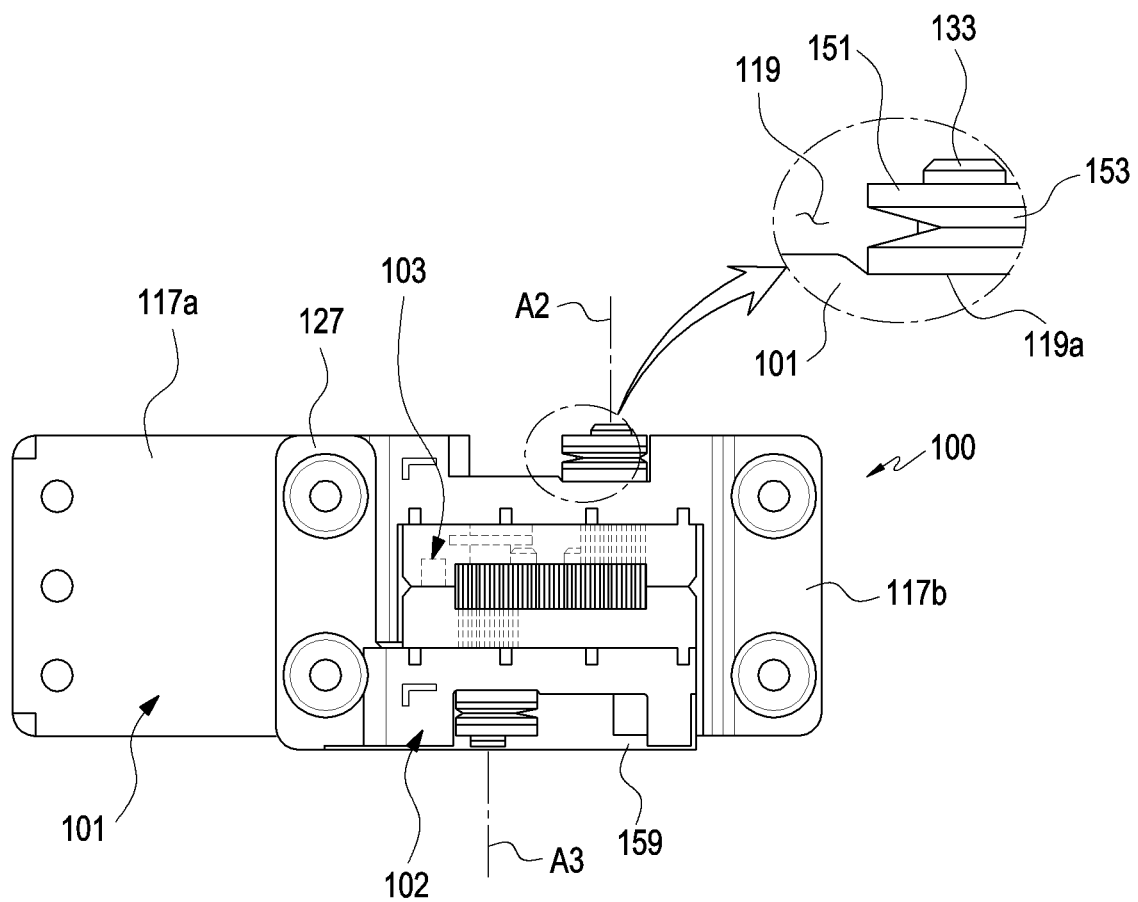
FIG. 9 is a plan view illustrating the hinge structure according to various embodiments of the disclosure.

FIG. 7 is an exploded perspective view illustrating a hinge structure 100 in an electronic device according to various embodiments of the disclosure. FIG. 8 is a perspective view illustrating the hinge structure 100 according to various embodiments of the disclosure in the assembled state. FIG. 9 is a plan view illustrating the hinge structure 100 according to various embodiments.

Referring to FIGS. 7 to 9, the hinge structure 100 (e.g., the hinge structure 15 in FIG. 4 or FIG. 6) may include a first guide member 101 (e.g., the first guide member 15a in FIG. 6), a second guide member 102 (e.g., the second guide member 15b in FIG. 6), and a gear module 103. In an embodiment, the gear module 103 may include a first shaft 103a including a first spur gear 131a and a second shaft 103b including a second spur gear 131b. In another embodiment, the gear module 103 may further include a third spur gear 103c and a fourth spur gear 104d to be described later, and the third spur gear 103c and the fourth spur gear 104d may interlock the rotation of the first shaft 103a and the rotation of the second shaft 103b. In another embodiment, the first and second guide members 101 and 102 may include inner gears 113b and 123b, respectively. The first and second guide members 101 and 102 may rotate or circle around a first axis (e.g., the first axis A1 in FIG. 6 or the first axis A1 in FIG. 11 to be described later) in reverse directions with respect to each other. For example, the first guide member 101 and the second guide member 102 may be interlocked via the gear module 103, for example, the first shaft 103a and the second shaft 103b. When viewed from the gear module 103, when the first guide member 101 rotates or circles clockwise, the second guide member 102 may rotate or circle counterclockwise. Here, the wording "A circles around B" may mean that A moves along a circle (or circular arc) trajectory around B. In the following detailed description, the gear module 103 will generally be described as a configuration including the first shaft 103a and the second shaft 103b, or the third spur gear and the fourth spur gear to be described later, but in some embodiments, it may be understood that the gear module 103 includes the inner gears 113b and 123b.

According to various embodiments, the first guide member 101 may include a first body 111 including a curved guide 115 and first coupling or engaging pieces 117a and 117b, each of which extends from the first body 111. The first body 111 may include a first opening 113a formed to penetrate the first body 111 from the inner face to the outer face along the direction of the first axis A1. For example, the first opening 113a may extend by a predetermined angle (e.g., an angle less than 90 degrees) along a circular arc trajectory (e.g., a curve trajectory) around the first axis A1. A first straight-toothed inner gear 113b may be formed on a portion of the inner wall of the first opening 113a. Each of the teeth of the first inner gear 113b may extend in a direction parallel to the first axis A1, and may be arranged along the circumferential direction of the first opening 113a having a curved shape.

According to an embodiment, the curved guide 115 is formed by the partially recessed upper face of the first body 111, the upper surface of the first body 111 is partially recessed, and may have a shape in which portions of the inner face of a cylindrical cylinder centered on the first axis A1 are combined. For example, the curved guide 115 may be formed in a substantially semi-cylindrically curved face. A first guide groove 113c having a circular arc trajectory corresponding to the curved guide 115 may be formed on the inner face of the first body 111. A plurality of first guide grooves 113c may be formed, and the trajectories of the first guide grooves 113c may be arranged on a circle substantially concentric to a circular arc trajectory formed by the first opening 113a. For example, the first opening 113a, the first guide grooves 113c, and the curved guide 115 may be formed based on respective circular arc trajectories around the first axis A1.

According to various embodiments, the first coupling or engaging pieces 117a and 117b may extend in directions away from each other from the outer circumferential face of the first body 111. Each of the first coupling or engaging pieces 117a and 117b may include fastening holes, and may be mounted and fixed to the housing (e.g., the housing 11 in FIG. 6) by fastening members such as screws in the state of being in close contact with inner face of the housing 11.

According to various embodiments, the first guide member 101 may include a first side face 119 oriented in a direction parallel to the first axis A1 and facing away from the second guide member 102, and the first opening 113a may be located in a region provided by the first side face 119. In some embodiments, the first side face 119 may include a first recess (e.g., the first recess 119a in FIG. 9) formed around an end region of the first opening 113a. As will be described later, a portion 131 of the first shaft 103a may be exposed onto the first side face 119 through the first opening 113a, and in the first side face 119, a washer 151 may be fastened to the first shaft 103a so as to couple or engage the first shaft 103a or the first spur gear 131 to the first guide member 101 in a rotatable state. A portion of the first spur gear 131 may be located inside the first opening 113a so as to be engaged with the first inner gear 113b, and may move along the circular arc trajectory of the first opening 113a while rotating in the first opening 113a.

According to various embodiments, the second guide member 102 may include a second body 121 and a second coupling or engaging piece 127 extending from the second body 121. The second body 121 may include an outer circumferential surface having a curved shape corresponding to the curved guide 115, and may include a second opening 123a form to penetrate the second body 121 from the inner face to the outer face (e.g., the a side face 129 to be described later) in the direction of the first axis A1. For example, the second opening 123a may extend by a predetermined angle (e.g., an angle less than 90 degrees) along a circular arc trajectory (e.g., a curve trajectory) around the first axis A1. A second straight-toothed inner gear 123b may be formed on a portion of the inner wall of the second opening 123a. According to various embodiments, the first inner gear 113b and the second inner gear 123b may be interlocked by the gear module 103 to move (or pivot) in reverse directions with respect to each other. According to some embodiments, the second guide member 102 may include a second side face 129 oriented in a direction parallel to the first axis A1 and facing away from the first guide member 101, and the second opening 123a may be located in a region provided by the second side face 129. In some embodiments, the second side face 129 may further include a second recess 129a formed around an end region of the second opening 123a.

According to an embodiment, a second guide groove 123c having a circular arc trajectory may be formed on the inner face of the second body 121, and may include the outer face of the second body 121, for example, the second side face 129. The second guide groove 123c and the second side face 129 have similar structures to the first guide groove 113c and the first side face 119, respectively, and a detailed description thereof will be omitted.

In some embodiments, when the second guide member 102 is engaged with the first guide member 101, the outer circumferential face of the second guide member 102 moves along the circular arc trajectory of the curved guide 115. For example, the second guide member 102 may circle around the first axis A1 following the guide of the outer circumferential face thereof and the curved guide 115. In other words, the first guide member 101 may circle around the first axis A1 following the guide of the outer circumferential face of the second guide member 102 and the curved guide 115. For the sake of concise description, a specific embodiment of the disclosure will be generally described with reference to a configuration in which the support plate 13 or the second guide member 102 moves or pivots in the state in which the housing 11 or the first guide member 101 is fixed. However, this does not limit the configuration of the disclosure, and this movement or pivoting movement practically means a relative movement of a plurality of components (e.g., the first guide member 101 and the second guide member 101), and the wording "B moves with respect to A" may be interpreted as "A moves with respect to B".

According to various embodiments, the second coupling or engaging piece 127 may extend substantially parallel to the first axis A1 from the outer circumferential face of the second body 121. The second coupling or engaging piece 127 may include one or more fastening holes, and may be exposed onto the seating face (e.g., the seating face 11c in FIG. 4) so as to be mounted and fixed to the inner face (e.g., the second face 13b in FIG. 3) of the support plate 13. In an embodiment, in the state in which the support plate 13 is in close contact with the seating face 11c, as illustrated in FIG. 9, the second coupling or engaging piece 127 may be located to face or to be in close contact with one of the first coupling or engaging pieces (e.g., the first coupling or engaging piece indicated by reference numeral "117a"). When the support plate 13 pivots to open, as illustrated in FIG. 8, the second coupling or engaging piece 127 may move away from one of the first coupling or engaging pieces so as to move closer to another one of the first coupling or engaging pieces (e.g., the first coupling or engaging piece indicated by reference numeral "117b").

Figure 10:
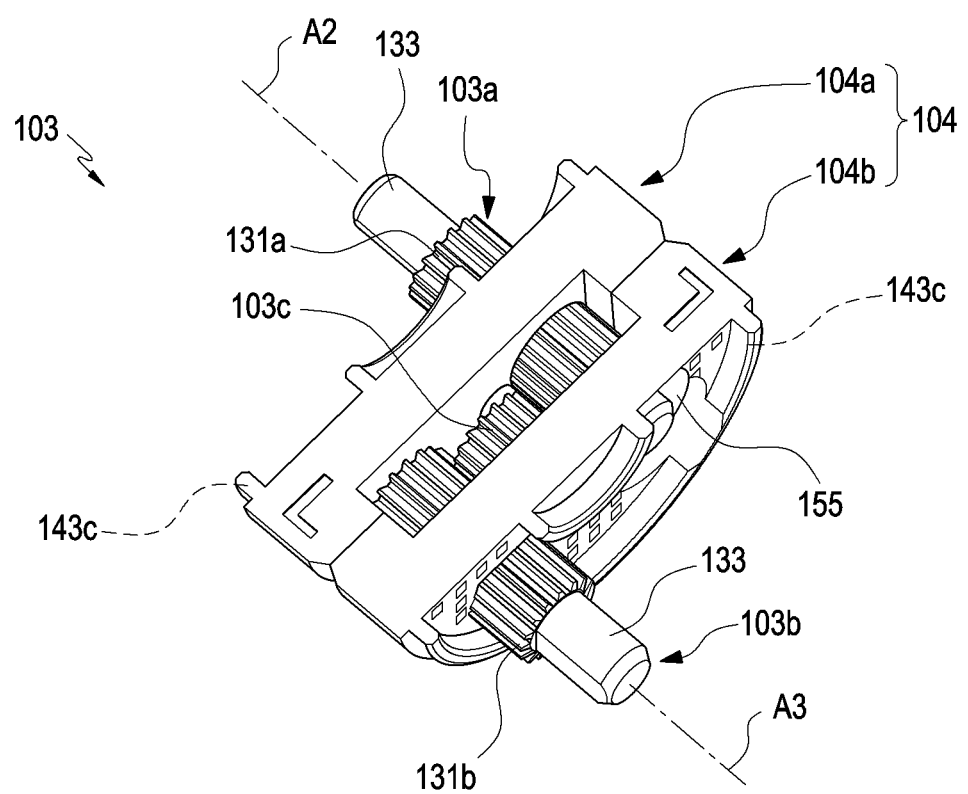
FIG. 10 is a perspective view illustrating a gear module of the hinge structure according to various embodiments of the disclosure.
Figure 11:
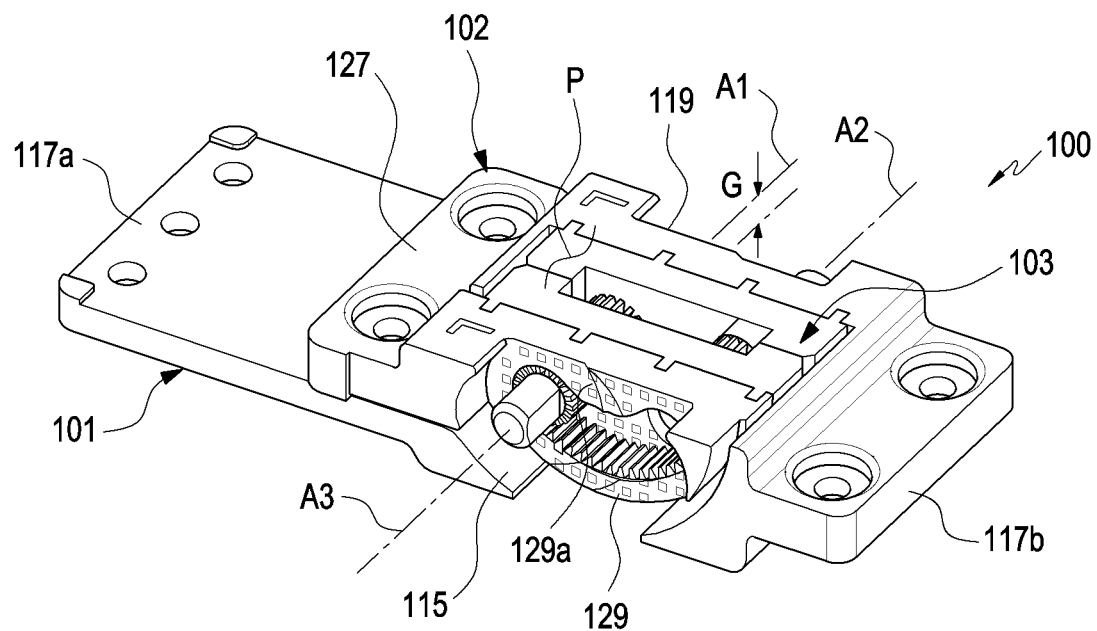
FIG. 11 is a perspective view illustrating a state in which the gear module is installed in the hinge structure according to various embodiments of the disclosure.

FIG. 10 is a perspective view illustrating a gear module 103 of the hinge structure according to various embodiments of the disclosure. FIG. 11 is a perspective view illustrating a state in which the gear module 103 is installed in the hinge structure according to various embodiments of the disclosure.

Further referring to FIGS. 10 and 11, the gear module 103 may be constituted with the first shaft 103a and the second shaft 103b configured to substantially interconnect the first inner gear 113b and the second inner gear 123b to each other. According to an embodiment, the first shaft 103a is rotated about a second axis A2 parallel to the first axis A1 and may include a first spur gear 131 made of straight teeth formed on the outer circumferential face thereof. A portion of the first spur gear 131 may be located in the first opening 113a to be engaged with the first inner gear 113b. When a portion of the first spur gear 131 is disposed in the first opening 113a, a portion 131 (e.g., one end) of the first shaft 103a may protrude to the first side face 119, and a washer may be fastened to the first shaft 103a on the first side face 119. Since a portion of the first spur gear 131 is engaged with the first inner gear 113b, when the first spur gear 131 rotates, the first shaft 103a may move along the circular arc trajectory of the first opening 113a.

According to various embodiments, while the first shaft 103a is moving along the circular arc trajectory of the first opening 113a, the washer 151 is in sliding contact with at least a portion of the first side face 119, thereby generating a frictional force. In some embodiments, when a portion of the outer circumferential face of the first shaft 103a is planar and thus the washer 131 is fixed to the first shaft 103a (e.g., when it is impossible to rotate with respect to the first shaft), the washer 151 may rotate in the first side face 119 with the rotation of the first spur gear 131 or with the rotation of the first shaft 103a. For example, as the first spur gear 131 rotates, the washer 151 may also be in sliding contact with at least a portion of the first side face 119 while rotating. In an embodiment, the frictional force generated between the washer 151 and the first side face 119 may provide a predetermined operation feeling to the user in the rotation of the support plate 13. In another embodiment, when the support plate 13 is stopped at any angular position, the frictional force generated between the washer 151 and the first side face 119 may stably maintain the stationary state of the support plate 13.

According to various embodiments, the second shaft 103b rotates about a third axis A3 parallel to the first axis A1 and/or the second axis A2, and may include a second spur gear 131b including straight teeth formed on the outer circumferential face thereof. A portion of the second spur gear 131 may be located in the second opening 123a so as to be interlocked with the first spur gear 131a while being engaged with the first inner gear 123b. For example, another portion of the second spur gear 131b may be engaged with another portion of the first spur gear 131a between the respective bodies (e.g., the first body 111 and the second body 121) of the first guide member 101 and the second guide member 102. The specific embodiment of the disclosure discloses a structure in which the second spur gear 131b is interconnected to the first spur gear 131a using a third spur gear 103c and a fourth spur gear 103d to be described later. However, as described above, the second spur gear 131b may be directly engaged with the first spur gear 131a, or fifth and sixth spur gears (not illustrated) may be further disposed so as to interconnect the second spur gear 131b to the first spur gear 131a.

When a portion of the second spur gear 131 is disposed in the second opening 123a, a portion (e.g., one end) of the first shaft 103b may protrude to the second side face 129, and another washer 151 may be fastened to the second shaft 103b on the second side face 129. Since the second spur gear 131b is engaged with the second inner gear 123b, the second spur gear 131b may move along the circular arc trajectory of the second opening 123a together with the second shaft 103b while rotating in the second opening 123a.

According to various embodiments, while the second shaft 103b is moving along the circular arc trajectory of the second opening 123a, the washer 151 is in sliding contact with a partial region of the second side face 129, thereby generating a frictional force. In some embodiments, when the washer is fixed with respect to the second shaft (e.g., when it is impossible to rotate with respect to the second shaft), the washer 151 may rotate in the second side face 123a together with the second spur gear 131b or together with the second shaft. For example, as the second spur gear 131b rotates, the washer 151 may also be in sliding contact with at least a partial region of the first side face 129 while rotating. In an embodiment, the frictional force generated between the washer 151 and the second side face 129 may provide a predetermined operation feeling to the user in the rotation of the support plate 13.

According to various embodiments, the hinge structure 100 may further include an additional washers 151 and one or more spring washers 153 so as to generate a stronger frictional force on the first side face 119 or the second side face 129. The arrangement structure of the spring washers 153 and the like will be described with reference to FIGS. 12 and 13.

Figure 12:
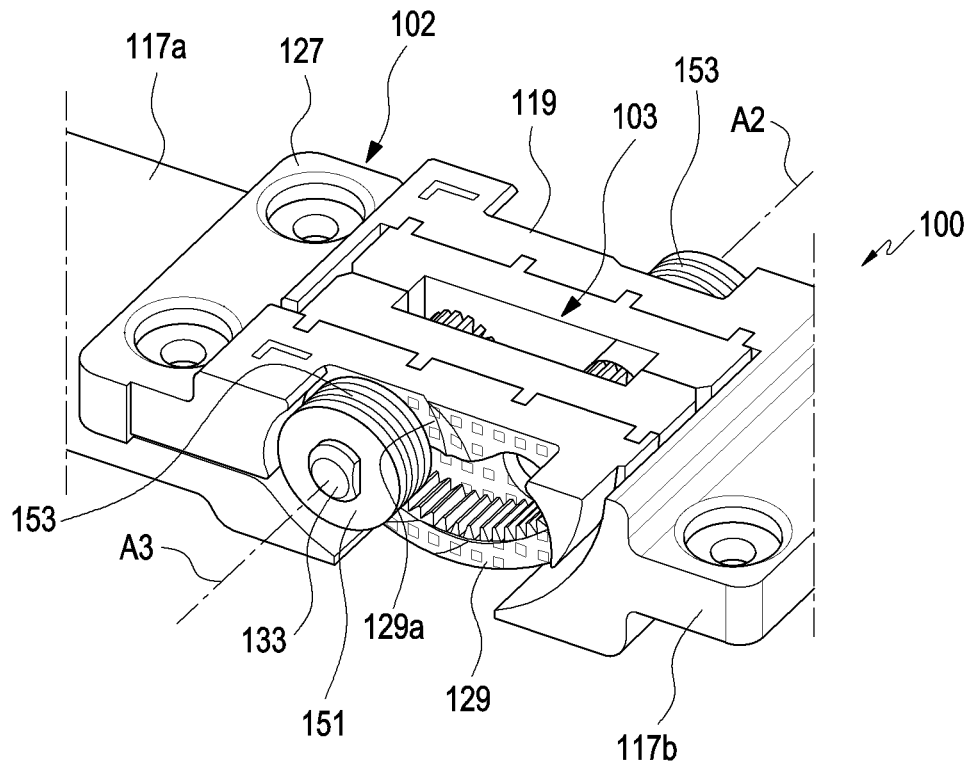
FIGS. 12 and 13 are views for describing a frictional force generation structure in the hinge structure according to various embodiments of the disclosure.
Figure 13:
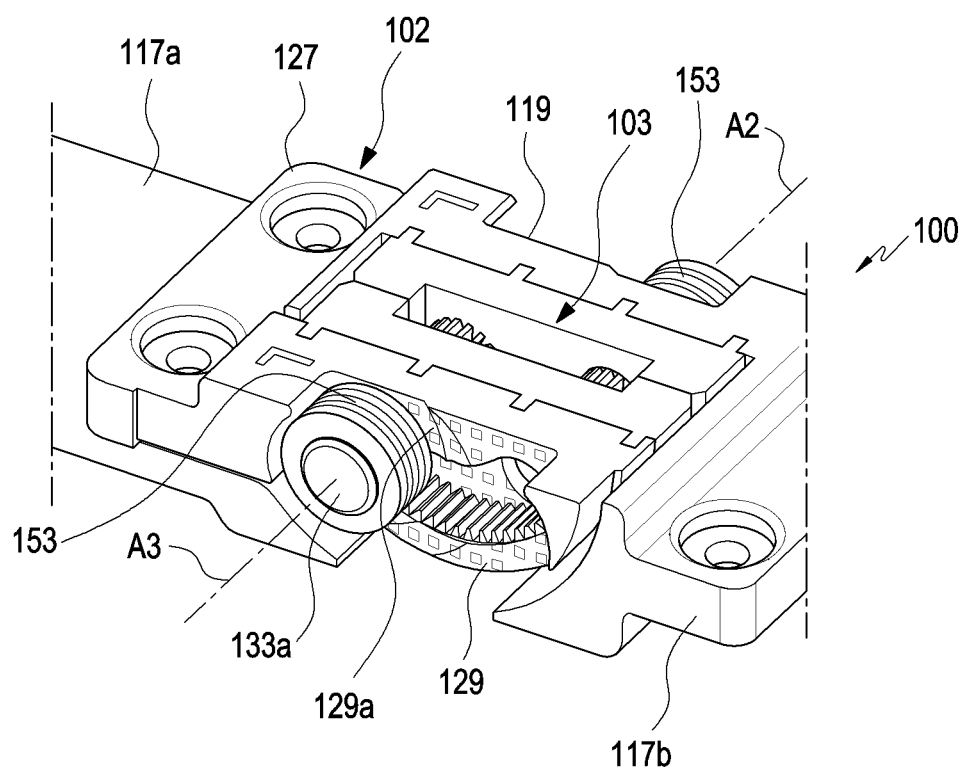

FIGS. 12 and 13 are views for describing a frictional force generation structure in the hinge structure 100 according to various embodiments of the disclosure.

Further referring to FIGS. 12 and 13, in the second side face 129, a plurality of washers 151 may be mounted side by side on the second shaft 103b, and one or more spring washers 153 may be mounted on the second shaft 103b between the washers 151. In the state in which the washers 151 and the spring washers 153 are mounted, an end portion 133 of the second shaft 103b may have a diameter 133a enlarged by a riveting process. For example, since the diameter of the end portion of the second shaft 103b is enlarged by the riveting process, the washers 151 and the spring washers 153 are capable of being restrained to the second shaft 103b. The mounting structures of the spring washers 153 and the like are equally applicable to the first shaft 103a.

According to an embodiment, the spring washers 153 provide an elastic force acting in a direction to move the washers 151 away from each other, and the washer directly facing the first side face 119 or the second side face 129 may be further in close contact with the first side face 119 or the second side face 129 by the spring washers 153. In some embodiments, friction protrusions may be formed on the first side face 119 or the second side face 129 so as to generate a greater frictional force with the washer 151. In another embodiment, the first side face 119 or the second side face 129 is a face inclined relative to the first axis A1 (or the movement direction of the first shaft 103a or the second shaft 103b). The frictional force generated by the washer 151 or the like may vary depending on the angle section in which the support plate 13 pivots (or the section in which the first shaft 103a or the second shaft 103b moves).

According to various embodiments, the state in which the electronic device 10 is cradled on a flat face may be stably maintained by the frictional force described above. In an embodiment, when the hinge structure, which couples the support plate to the housing, does not provide any frictional force, it may be practically impossible to cradle the electronic device on a flat face so as to form an angle with respect to the flat face in the state in which the support plate is opened by a predetermined angle or more. For example, in the structure in which the hinge structure does not provide any frictional force, when the electronic device is cradled mounted on a flat face in the state in which the support plate is opened by 130 degrees from the seating face, the support plate may be opened up to an angle substantially close to 180 degrees from the seating face due to the weight of the housing.

Since the hinge structure 100 according to various embodiments of the disclosure may provide a frictional force between the washer 151 and the first side face 119 or between the washer 151 and the second side face 129, the cradling state of the electronic device 10 may be stably maintained even in the state in which the support plate 13 is opened at an angle of 130 degrees or more from the seating face (e.g., the seating face 11c in FIG. 3). As described above, the frictional force described above may be appropriately adjusted using the friction protrusions or the inclined face structure of the first side face 119 or the second side face 129.

According to various embodiments, the first side face 119 may further include a first recess 119a as illustrated in FIG. 9. The first recess 119a may be formed to correspond to the washer 151 in the state in which the second coupling or engaging piece 127 is in close contact with one of the first coupling or engaging pieces (e.g., the first coupling or engaging piece indicated by reference numeral "117a") (or the support plate 13 is in close contact with the seating face 11c). For example, when reaching the first recess 119a, the washer 151 may be seated in the first recess 119a by the elastic force of the spring washers 153, and the support plate 13 is capable of stably maintaining the state of being in close contact with the seating face 11c.

According to various embodiments, the second side face 129 may further include a second recess 129a. The second recess 129a may have a shape similar to the first recess 119a. When reaching the second recess 129a, the washer 151 according to an embodiment may be seated in the second recess 129a by the elastic force of the spring washers 153, and the support plate 13 is capable of stably maintaining the state of being in close contact with the seating face 11c.

Further referring to FIG. 7, the hinge structure 100 may further include a third spur gear 103c and a fourth spur gear 103d so as to interconnect the first inner gear 131a and the second inner gear 131b to each other. The third spur gear 103c rotates in engagement with the first spur gear 131a and may include straight teeth corresponding to teeth of the first spur gear 131a. The fourth spur gear 103d rotates in engagement with each of the third spur gear 103c and the second spur gear 131b, and may include straight teeth corresponding to teeth of the second spur gear 131b or the third spur gear 103c. In some embodiments, as described above, the third spur gear 103c and the fourth spur gear 103d do not necessarily have to be disposed, and the first spur gear 131a and the second spur gear 131b may be interconnected by being directly engaged with each other.

According to an embodiment, the hinge structure 100 may be downsized by disposing the third spur gear 103c and the fourth spur gear 103d so as to interconnect the first inner gear 131a and the second inner gear 131b to each other. For example, as illustrated in FIG. 10, when the first spur gear 131a and the second spur gear 131b are directly engaged with each other in the state in which the positions of the second axis A2 and the third axis A3 are determined, the diameter of each or at least one of the first and second spur gears 131a and 131b may be increased. As the diameter of the first spur gear 131a or the second spur gear 131b increases, the diameter of the first opening 113a or the second opening 123a may also increase, resulting in the size increase of the hinge structure 100.

According to various embodiments of the disclosure, the third spur gear 103c and the fourth spur gear 103d may provide an environment in which the first spur gear 131a and the second spur gear 131b are downsized by disposing the third spur gear 103c and the fourth spur gear 103d while interconnecting the first inner gear 131a and the second inner gear 131b to each other. For example, even if the diameters of the first spur gear 131a and the second spur gear 131b are smaller and are not directly engaged with each other, the second spur gear 131b may be interconnected with the first gear 131a through the third spur gear 103c and the fourth spur gear 103d. In another embodiment, a fifth spur gear and/or a sixth spur gear (not illustrated) may be further disposed between the third spur gear 103c and the fourth spur gear 103d so as to further reduce the diameter of each of the above-described spur gears. In various embodiments of the disclosure, the number, diameters, arrangement positions, and the like of the spur gears may be appropriately determined in consideration of the movement trajectory of the second guide member 102 with respect to the first guide member 101, the size of the hinge structure 100 allowed in the electronic device 10, or the like. However, in determining the number of spur gears, it should be noted that the first spur gear 131a and the second spur gear 131b rotate in the reverse directions with respect to each other when the first spur gear 131a and the second spur gear 131b are interconnected with each other and rotate.

According to various embodiments, the hinge structure 100 or the gear module 103 may further include a module bracket 104. Referring to FIG. 7 or FIG. 10, the module bracket 104 at least partially accommodates the first to fourth spur gears 131a, 131b, 103c, and 103d, and may be disposed between the first guide member 101 and the second guide member 102. In some embodiments, the outer circumferential face of the module bracket 104 may be formed as a curved face corresponding to the curved guide 115. For example, the module bracket 104 may be disposed between the first guide member 101 and the second guide member 102, and may circle around the first axis A1 following the guide of the curved guide 115.

According to an embodiment, the module bracket 104 may include a first module bracket 104a and a second module bracket 104b, which are coupled to face each other in the direction of the first axis A1. The first module bracket 104a may be disposed to face the inner face of the first guide member 101, and the second module bracket 104b may be disposed to face the inner face of the second guide member 102. In some embodiments, another portion of each of the first spur gear 131a and the second spur gear 131b may be accommodated in the space inside the module bracket 104 (e.g., the space between the first module bracket 104a and the second module bracket 104b).

According to various embodiments, each of the first module bracket 104a and the second module bracket 104b may include gear holes 141a, and still another portion of each of the first spur gear 131a and the second spur gear 131b may protrude to the outside of the module bracket 104 through a gear hole 141a. For example, a portion of the first spur gear 131a (or the second spur gear 131b) may be disposed inside the first opening 113a (or the second opening 123a) from the outside of the module bracket 104 through the gear hole 141a. In an embodiment, the third spur gear 103c and the fourth spur gear 103d may be rotatably mounted on the inner face of the first module bracket 104a and the inner face of the second module bracket 104b, respectively, and in the module bracket 104, the third spur gear 103c and the fourth spur gear 103d may be engaged with other portions of the first spur gear 131a and the second spur gear 131b, respectively.

According to various embodiments, the module bracket 104 may include coupling or engaging holes 141b formed in the first module bracket 104a and the second module bracket 104b, respectively. For example, the other end portion of the first shaft 103a may be exposed to the outer face of the second module bracket 104b through the coupling or engaging hole 141b in the second module bracket 104b, and a fixing washer 155 (see FIG. FIG. 10) may be engaged at the other end portion of the first shaft 103a at the outer face of the second module bracket 104b. For example, the module bracket 104 may be coupled to or engaged with the first guide member 101 by the first shaft 103a, the washer 151, and the fixing washer 155. When the first shaft 103a or the first spur gear 131a rotates in the state of being coupled to or engaged with the first guide member 101, the first shaft 103a moves along the circular arc trajectory of the first opening 113a, and the module bracket 104 may circle around the first axis A1 following the guide of the curved guide 115.

In another embodiment, the other end portion of the second shaft 103b may be exposed to the outer face of the first module bracket 104a through the coupling or engaging hole in the first module bracket 104a, and a fixing washer may be coupled to or engaged with the other end portion of the second shaft 103b on the outer face of the first module bracket 104a. For example, the module bracket 104 may be coupled to or engaged with the second guide member 102 by the second shaft 103a, the washer 151, and the fixing washer. When the second shaft 103b or the second spur gear 131b rotates in the state of being coupled to or engaged with the second guide member 102, the second shaft 103b moves along the circular arc trajectory of the second opening 123a, and the module bracket 104 or the second guide member 102 may circle around the first axis A1 following the guide of the curved guide 115.

According to various embodiments, the first guide member 101 and the second guide member 102 may be interconnected with each other via the gear module 103. For example, when any one of the first guide member 101, the second guide member 102, and the gear module 103 circles around the first axis A1 with respect to another one, the remaining one may also circle around the first axis A1 with respect to the another one. For example, assuming that the first guide member 101 is fixed, when the gear module 103 circles with respect to the first guide member 101, the second guide member 102 may also circle with respect to the first guide member, and at the same time, the second guide member 102 may also circle with respect to the gear module 103.

According to various embodiments, when the module bracket 104 or the second guide member 102 circles with respect to the first guide member 101, a frictional force may be generated between the first guide member 101 and the module bracket 104 or between the second guide member 102 and the module bracket 104. For example, since the module bracket 104 is coupled to or engaged with the first guide member 101 by the first shaft 103a, the washer 151, and the fixing washer 155, the inner face of the first guide member 101 and the outer face of the first module bracket 104a may be in close contact with each other by an elastic force provided by the spring washer 153. The inner face of the second guide member 102 and the outer face of the second module bracket 104b may also be in close contact with each other. Therefore, it is possible to improve the operation feeling or the stability at a certain angular position in the operation in which the support plate 13 circles.

According to various embodiments, the first module bracket 104a may include a guide rib 143c having a circular arc trajectory formed on the outer face (e.g., a face facing the inner face of the first guide member 101). The guide rib 143c is slidably engaged with the first guide groove 113c so as to guide the circling motion of the module bracket 104 with respect to the first guide member 101. Similarly, the second module bracket 104b may also include a guide rib 143c engaged with the second guide groove 123c, and may guide the circling motion of the module bracket 104 with respect to the second guide member 102.

According to various embodiments, the hinge structure 100 may further include a cover member 159 configured to close and conceal the first side face 119 or the second side face 129. For example, as the first spur gear 13 pivots, at least a portion of the first side face 119 or the second side face 129 may also be exposed to the outside. The cover member 159 is a portion of the hinge structure 100, and may disposed at a portion that is selectively exposed depending on the pivot of the support plate 13 so as to conceal a mechanical structure of the hinge structure 100 or the like and to make the outer appearance of the electronic device 10 beautiful.

Referring back to FIG. 11, in the state in which the support plate 13 is closed (or in the state in which the second coupling or engaging piece 127 is in close contact with one of the first coupling or engaging pieces), at least a portion of the upper face of the hinge structure 100 may form a flat face P (or a curved face) in which a portion of the surface of each of the first guide member 101, the module bracket 104 (or the gear module 103), and the second guide member 102 is combined. The first axis A1 may be disposed at a position outside the hinge structure 100, for example, at a position spaced apart from the flat face P by a predetermined distance G, and the relative movement of the first guide member 101, the module bracket 104, and the second guide member 102 may be a circling motion around the first axis A1.

Figure 14:
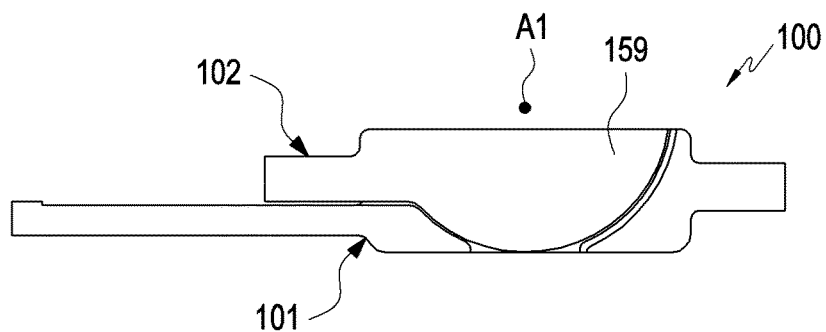
FIGS. 14 to 16 are views sequentially illustrating operating states of the hinge structure according to various embodiments of the disclosure.
Figure 15:
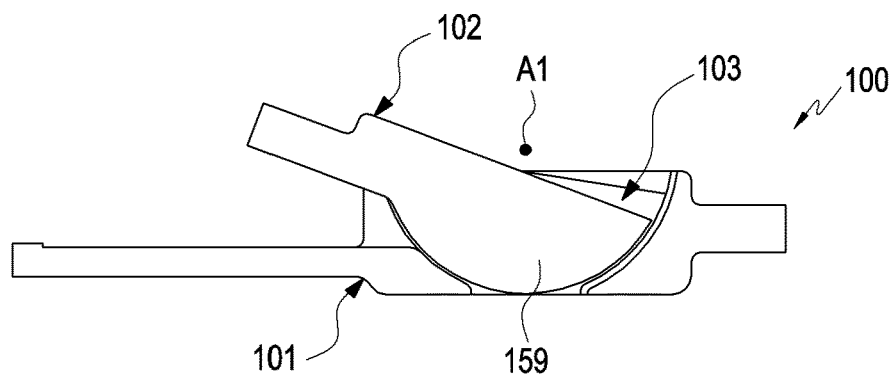
Figure 16:
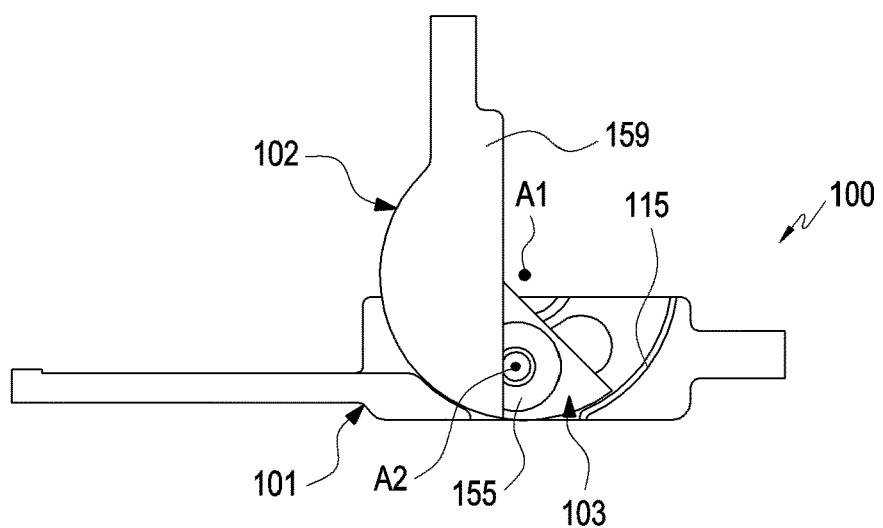
Figure 17:
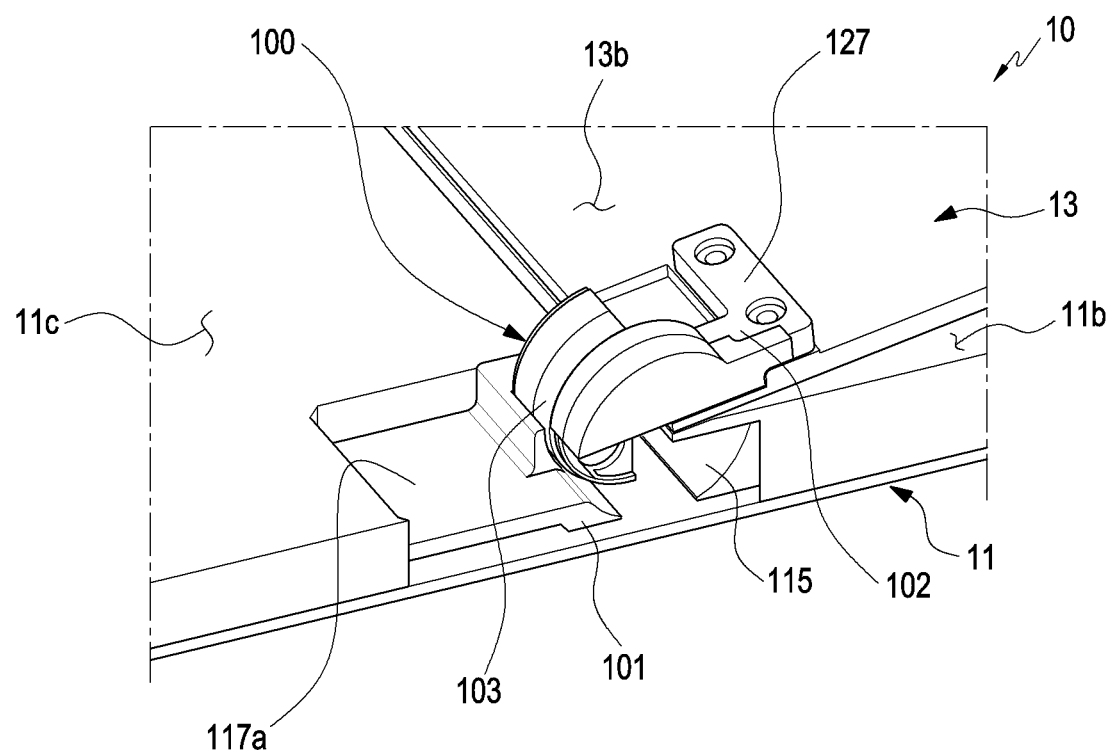
FIG. 17 is a perspective view illustrating the hinge structure when the support plate is opened in the electronic device according to various embodiments of the disclosure.

FIGS. 14 to 16 are views sequentially illustrating operating states of the hinge structure (e.g., the hinge structure 100 in FIG. 7) according to various embodiments of the disclosure. FIG. 17 is a perspective view illustrating the hinge structure 100 when the support plate (e.g., the support plate 13 in FIG. 3) is opened in the electronic device according to various embodiments of the disclosure.

FIG. 17 illustrates a state in which the support plate 13 is opened to a position at which a portion thereof is almost in contact with the rear face 11b of the housing (e.g., the housing 11 in FIG. 3). However, as described above, the electronic device 10 may include a flexible layer (e.g., the flexible layer 17 in FIG. 6). When a portion of the flexible layer 17 is attached to the first face 13a of the support plate 13 and the other portion is attached to the rear face 11b (e.g., a region outside the seating face 11c), the maximum angle to which the support plate 13 can be opened may be less than or equal to that shown in FIG. 17.

Referring to FIGS. 14 to 17, each of the gear module 103 and the second guide member 102 circles with respect to the first guide member 101, and the circling motion of each of the gear module 103 and the second guide member 102 may follow a circular arc trajectory around the first axis A1. As mentioned above, the wording "the gear module circles (makes a circling motion) around the first axis" means that the first axis A1 is located outside the hinge structure 100 or the gear module 103, and that the gear module 103 moves along a circular arc trajectory around the first axis A1. In some embodiments, when it is defined that each of the first shaft 103a and the second shaft 103b (e.g., the central axes of the first shaft 103a and the second shaft 103b) is located at a first position from the first axis A1 when the gear module 103 is located at a first angular position (e.g., the position illustrated in FIG. 14) with respect to the first axis A1, each of the first shaft 103a and the second shaft 103b may be located at the first distance from the first axis A1, even when the gear module 103 circles (or makes a circling motion) around the first axis A1 and reaches a second angular position (e.g., the position illustrated in FIG. 16). For example, when each of the first shaft 103a and the second shaft 103b circles around the first axis A1, the distance between the central axis of each of the first shaft 103a and the second shaft 103b and the first axis A1 may be constant.

According to various embodiments, in the state in which the support plate 13 is in close contact with the seating face 11c, as illustrated in FIG. 14, the second coupling or engaging piece 127 of the second guide member 102 may be coupled to or engaged with one 117a of the first coupling or engaging pieces. When the support plate 13 pivots in a direction gradually away from the seating face 11c, the second guide member 102 circles around the first axis A1, and the second inner gear (e.g., the second inner gear 123b in FIG. 7) may also circle around the first axis A1. According to various embodiments, in the state in which the support plate 13 is in close contact with the seating face 11c, or in the state in which the second coupling or engaging piece 127 is in close contact with one 117a of the first coupling or engaging pieces, at least one of the washers (e.g., the washers 151 in FIG. 7) may be engaged with the first recess (e.g., the first recess 119a in FIG. 9) formed in the first side face (e.g., the first side face 119 in FIG. 7) or the second recess (e.g., the second recess 129a in FIG. 11) formed in the second side face (e.g., the second side face 129 in FIG. 11).

As the second inner gear 123b makes a circling motion, the second spur gear (e.g., the second spur gear 131b in FIG. 7) engaged with the second inner gear 123b may move along the circular arc trajectory of the second opening (e.g., the second opening 123a in FIG. 7). When the second spur gear 131b moves along the circular arc trajectory of the second opening 123a, the module bracket (e.g., the module bracket 104 in FIG. 10) may move with respect to the second guide member 102. This movement may be substantially implemented by a guide structure in which the outer circumference faces of the curved guide 115 and the module bracket 104 and the outer circumferential face of the second guide member 102 are combined. In some embodiments, when viewed with respect to the second guide member 102, the module bracket 104 may circle substantially around the first axis A1 when the second spur gear 131b moves along the circular arc trajectory of the second opening 123a.

According to various embodiments, when the support plate 13 pivots and the second spur gear 131b rotates, the first spur gear (e.g., the first spur gear 131a in FIG. 7) may be interlocked with the second spur gear 131b so as to rotate in a reverse direction to the second spur gear 131b. For example, the second spur gear 131b rotates while moving along the circular arc trajectory of the second opening 123a, and the third spur gear (e.g., the third spur gear 103c in FIG. 7) engaged with the second spur gear 131b and the fourth spur gear (e.g., the fourth spur gear 103d in FIG. 7) engaged with the third spur gear 103c may also rotate therewith. When the fourth spur gear 103d rotates, the first spur gear 131a may also rotate, and since the first spur gear 131a is engaged with the first inner gear (e.g., the first inner gear 113b in FIG. 7), the first spur gear 131a may move along the circular arc trajectory of the first opening 113a. For example, the first spur gear 131a may move the gear module 103 (e.g., the module bracket 104) with respect to the first guide member 101 while moving along the circular arc trajectory of the first opening 113a. As described above, the module bracket 104 may move with respect to the first guide member 101 following the guide of the curved guide 115. In some embodiments, when viewed with respect to the module bracket 104, the first guide member 101 may circle substantially around the first axis A1 when the first spur gear 131a moves along the circular arc trajectory of the first opening (e.g., the first opening 113a in FIG. 7). In another embodiment, when viewed with respect to the module bracket 104, the second guide member 102 may circle substantially around the first axis A1 in a reverse direction to the first guide member 101 when the first spur gear 131a circles around the first axis A1.

According to various embodiments, while the support plate 13 is pivoting, at least one of the washers 151 may rub against the first side face (e.g., the first side face 119 in FIG. 7) or the second side face 129, and the outer face of the module bracket 104 may rub against the first guide member 101 or the second guide member 102. The frictional force generated by the one or more washers 151, the module bracket 104 or the like may provide the user with confidence that the electronic device 10 is capable of being stably cradled, and in fact may provide the environment in the electronic device 10 is capable of being stably cradled. For example, when the support plate 13 is stopped in the state of being opened by a predetermined angle, the washers 151, the module bracket 104, or the like may provide a static frictional force, and the static frictional force may be equal to or greater than a load (e.g., a moment) applied to the hinge structure 100 by the weight of the housing 11 or the like in the cradling state.

Figure 18:
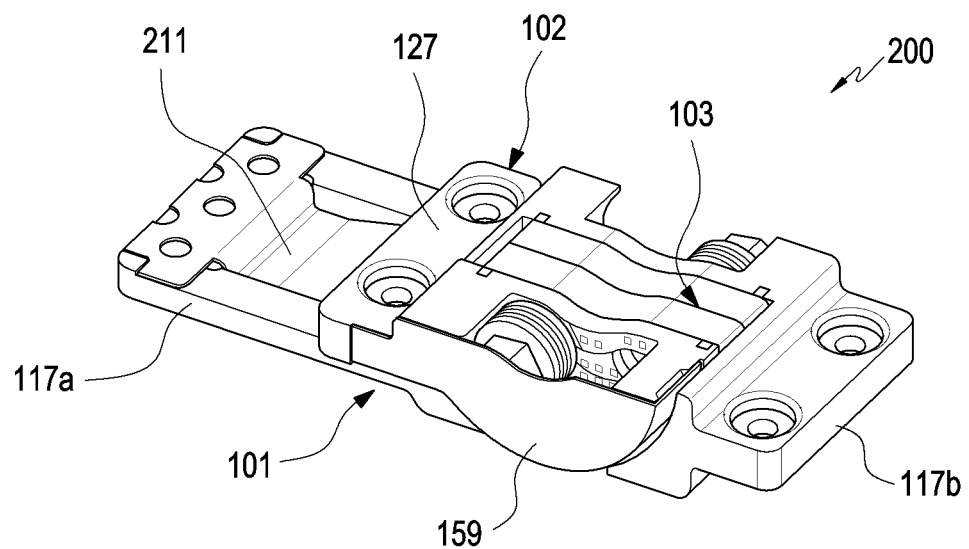
FIGS. 18 and 19 are perspective views illustrating a modification of the hinge structure according to various embodiments of the disclosure.
Figure 19:
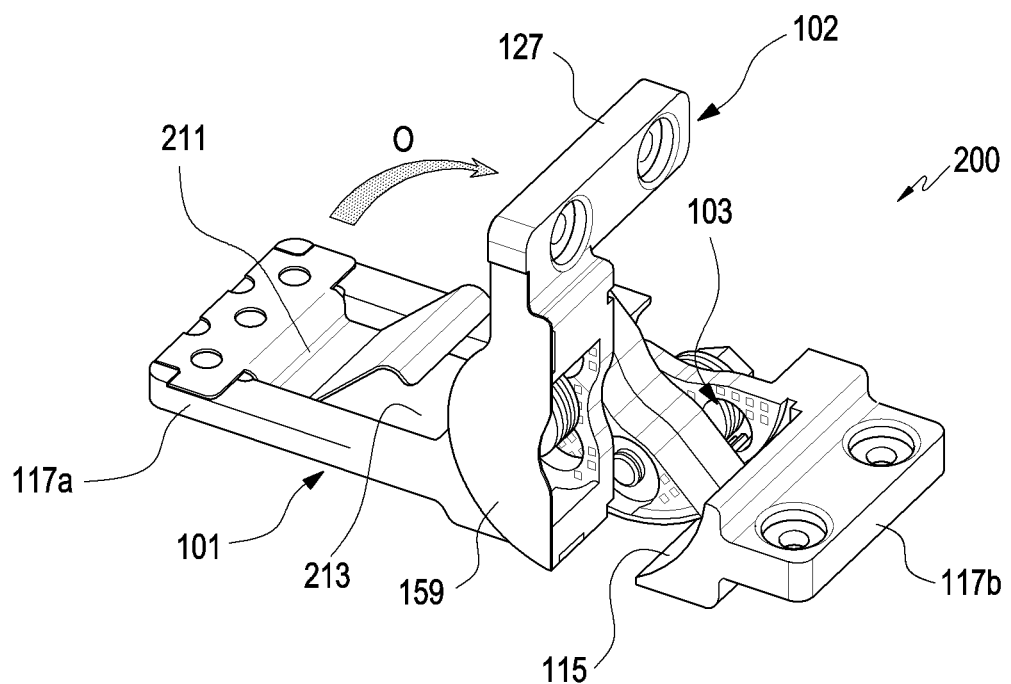

FIGS. 18 and 19 are perspective views illustrating a modification of the hinge structure according to various embodiments of the disclosure.

A hinge structure 200 according to this embodiment is similar to the hinge structure (e.g., the hinge structure 100 in FIG. 7) of the above-described embodiment. Thus, it is noted that the components, which can be easily understood through the above-described embodiments, may be denoted by the same reference numerals as the above-described embodiments or the reference numerals may be omitted, and that the detailed descriptions thereof may also be omitted.

According to various embodiments of the disclosure, the hinge structure 200 may further include an elastic member 211 that moves the support plate 13 away from the seating face 11c by a predetermined angle. For example, as described above, when the support plate 13 is not exposed to the side face of the housing 11 in the state in which the support plate 13 is accommodated in the seating face 11c, it may be difficult for the user to move the support plate 13 away from the seating face 11c. The elastic member 211 is mounted on the first guide member 101 (e.g., one 117a of the coupling or engaging pieces), and in the state in which the second coupling or engaging piece 127 is in close contact with the one 117a of the first coupling or engaging pieces, the elastic member 211 may interfere with the second guide member 102 (e.g., the second coupling or engaging piece 127) to provide an elastic force to move the second coupling or engaging piece 127 away from the one 117a of the first coupling and engaging pieces.

According to various embodiments, the first coupling or engaging piece 117a may include an opening 213, and the elastic member 211 may be mounted on the first coupling or engaging piece 117a in the state of being partially accommodated in the opening 213. According to an embodiment, the elastic member 211 is mounted and fixed to the surface of the first coupling and engaging piece 117a around the opening 213, and may be bent and extend such that the elastic member 211 is partially accommodated in the opening 213 and the end portion thereof protrudes to the surface of the first coupling or engaging piece 117a. In the state in which the support plate 13 is accommodated in or is in close contact with the seating face 11c, the second coupling or engaging piece 127 may interfere with the end portion of the elastic member 211. For example, the second binding piece 127 receives an elastic force acting in a direction O away from the first coupling or engaging piece 117a, and thus the support plate 13 is capable of pivoting in a direction away from the seating face 11c.

As described above, in the state in which the support plate 13 is accommodated in or in close contact with the seating face 11c, the elastic member 211 may move the support plate 13 away from the seating face 11c to some extent, thereby forming a space (e.g., the space between the seating face 11c and the support plate 13) in which the user is capable of manipulating the support plate 13. For example, the elastic member 211 may provide an environment that allows the user to easily manipulate the support plate 13.

According to various embodiments, since the electronic device 10 further includes a lock/unlock structure 202, the support plate 13 may be locked in the state of being accommodated in the seating face 11c, and this locked state may be released when it is desired to pivot the support plate 13.

The lock/unlock structure 202 described above will be described with reference to FIGS. 20 to 25.

Figure 20:
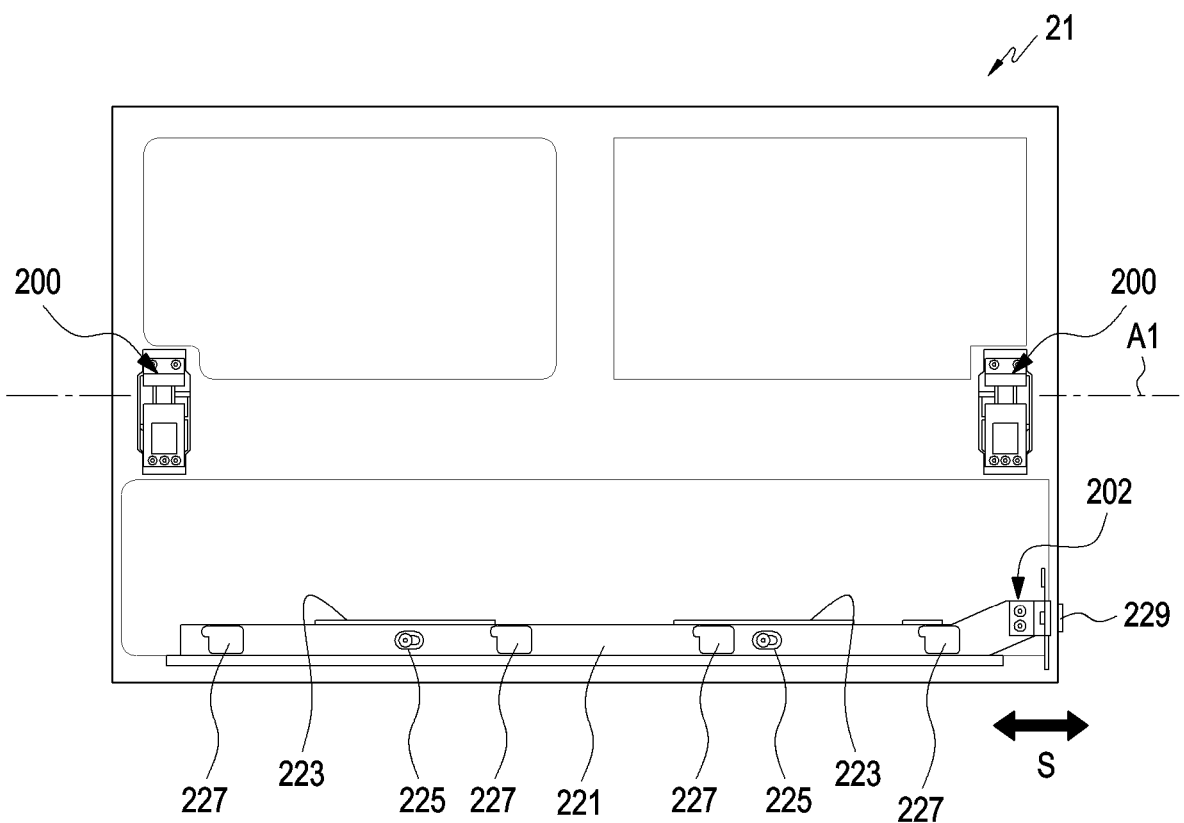
FIG. 20 is a view illustrating a housing in the modification of the electronic device.
Figure 21:
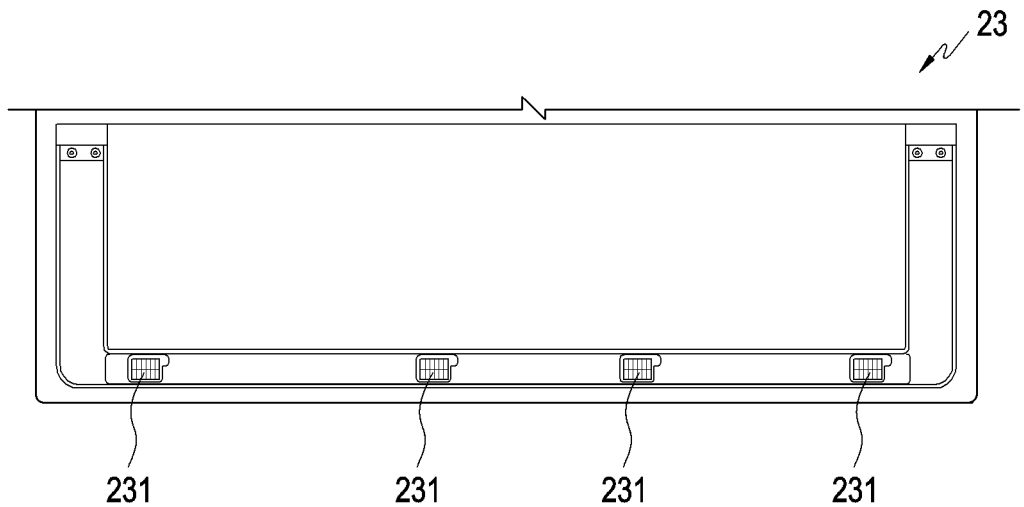
FIG. 21 is a view illustrating a support plate in the modification of the electronic device according to various embodiments of the disclosure.
Figure 22:
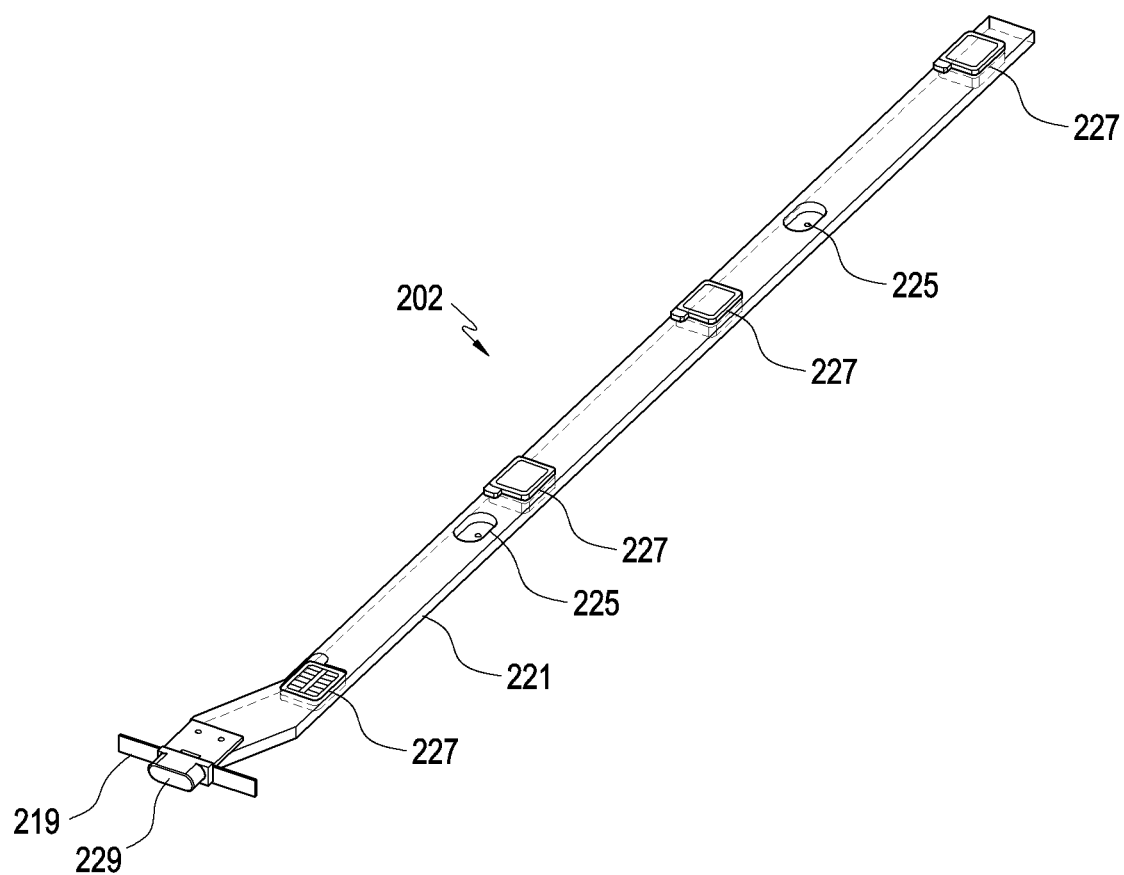
FIG. 22 is a perspective view illustrating a part of a lock/unlock structure in the modification of the electronic device according to various embodiments.
Figure 23:
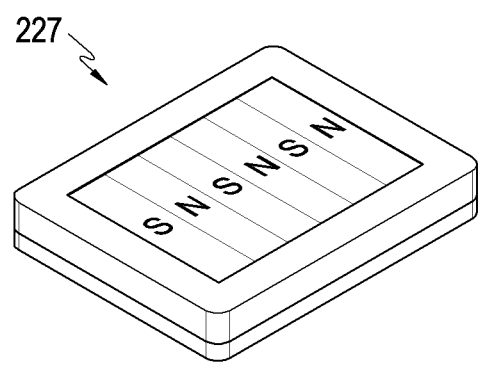
FIG. 23 is a perspective view illustrating magnetic bodies forming a part of the lock/unlock structure in the modification of the electronic device according to various embodiments.
Figure 24:
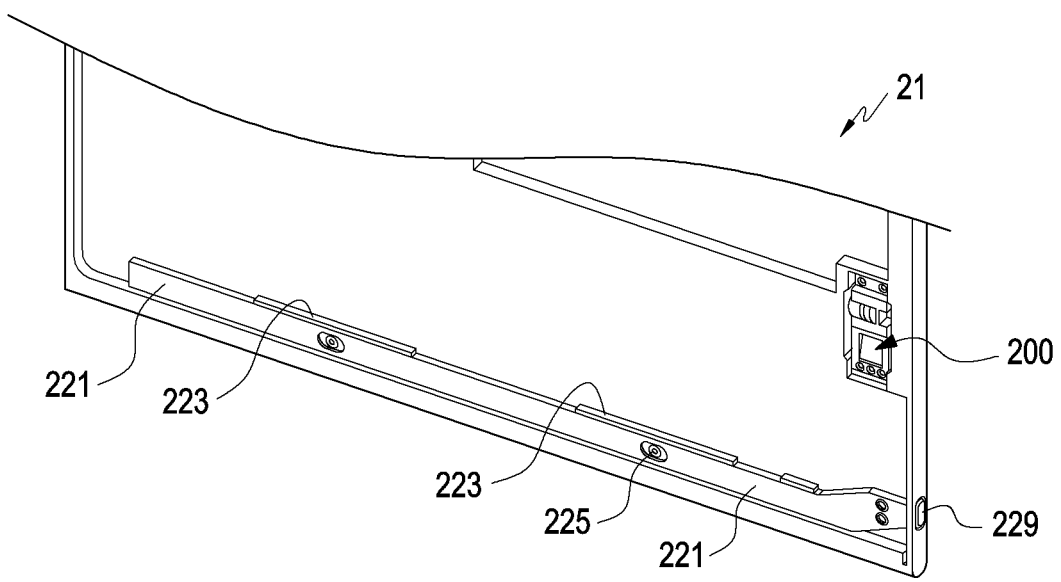
FIG. 24 is a view for describing an arrangement of the lock/unlock structure in the modification of the electronic device according to various embodiments.
Figure 25:
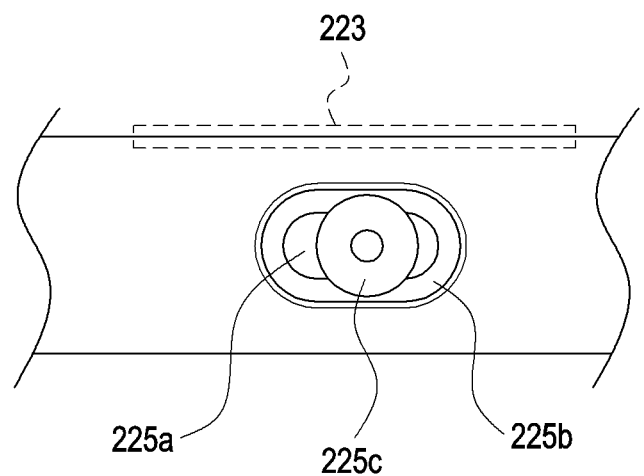
FIG. 25 is a perspective view illustrating a guide/installation structure of the lock/unlock structure in the modification of the electronic device according to various embodiments.

FIG. 20 is a view illustrating a housing 21 in a modification of the electronic device. FIG. 21 is a view illustrating a support plate 23 in the modification of the electronic device. FIG. 22 is a perspective view illustrating a part of the lock/unlock structure 202 in the modification of the electronic device according to various embodiments. FIG. 23 is a perspective view illustrating magnetic bodies 227 constituting the lock/unlock structure 202 in the modification of the electronic device according to various embodiments. FIG. 24 is a view for describing an arrangement of the lock/unlock structure 202 in the modification of the electronic device according to various embodiments. FIG. 25 is a perspective view illustrating a guide/installation structure of the lock/unlock structure 202 in the modification of the electronic device according to various embodiments.

Referring to FIGS. 20 to 25, according to various embodiments of the disclosure, an electronic device (e.g., the electronic device 10 in FIGS. 1 to 5) may include a housing 21, a support plate 23, hinge structures 200, and a lock/unlock structure 202. Since the housing 21 and the support plate 23 can be easily understood through the above-described embodiments, a detailed description thereof will be omitted.

The hinge structure 200 is, for example, a hinge structure illustrates in FIG. 18 or 19, and may include an elastic member 211 that moves the second coupling or engaging piece 127 away from the first coupling or engaging piece 117a. For example, the lock/unlock structure 202 may be combined with the hinge structures each including the elastic member 211 in order to facilitate the use of the electronic device (e.g., the manipulation of the support plate 23). The hinge structures 200 may be disposed at opposite edges of the housing 21 to form the first axis A1 (e.g., the first axis A1 in FIG. 11). The support plate 23 may be mounted to the hinge structures 200 to be opened and closed by pivoting around the first axis A1.

According to various embodiments, the lock/unlock structure 202 may be implemented by a combination of a slider 221 slidably (S) mounted in the housing 21 in the state in which the first magnetic bodies 227 are mounted thereon and second magnetic bodies 231 mounted on the support plate 23. The slider 221 may be mounted to be slidable (S) in a direction parallel to the first axis Al from a position spaced apart from the first axis Al in the housing 21. However, the disclosure is not limited thereto, and as will be described below, when it is possible to change the relative positions of the first magnetic bodies 227 and the second magnetic bodies 231, the installation position or the moving direction of the slider 221 may be variously designed.

According to various embodiments, the slider 221 may be mounted in the housing 21 in the state of slidably moving through the slide ribs 223 and the long holes 225a. The slide ribs 223 extend in the moving direction of the slider 221 and may be coupled to at least partially surround an edge of the slider 221. In some embodiments, a slide groove having an undercut structure is formed in the inner wall of the housing 21, and at least a portion of the edge of the slider 221 may be coupled to the slide groove. The long holes 225a may be formed through the slider 221 and may extend along the moving direction S of the slider 221. According to an embodiment, a retraction groove 225b may be formed around each long hole 225a in one face of the slider 221, and a contact member 225c may be disposed in the retraction groove 225b. The contact member 225c may be made of a synthetic resin having mechanical strength and lubricity. Although not shown, a fastening member such as a screw may be fastened to the housing 21 through the long hole 225a and/or the contact member 225c, and the slider 221 may be fastened to the inside of the housing 21 by such a fastening member so as to be slidable within an extended length range of the long hole 225.

According to an embodiment, the slider 221 may include a button 229 exposed to the outside through the side wall of the housing 21, and the user may move the slide 221 by manipulating the button 229. The range in which the slider 221 is movable by manipulating the button 229 may be 2 to 3 mm, and the slider 211 may slide in a smaller or larger range beyond this range. In another embodiment, the lock/unlock structure 202 may further include an elastic body 219 fixed to the housing 21. The elastic body 219 may maintain the button 229 in the state protruding to the outside of the housing 21 in the absence of an external force (e.g., in the absence of the user's manipulation). Here, the wording "the button protrudes to the outside of the housing" may be different in meaning from the wording "the button 229 protrudes outward from the outer face of the housing". For example, even if the button 229 protrudes to the outside of the housing 21 as much as possible, the outer face of the button 229 may be located on the same flat face or the same curved face as the outer face of the housing 21, and the button 229 is movable to the inside of the housing 21 according to the user's manipulation.

According to various embodiments, the first magnetic bodies 227 may form a combination of N poles and S poles arranged alternately at a predetermined interval in the moving direction of the slider 221. In the first magnetic body 227, the arrangement interval of the N poles and the S poles may be equal to or smaller than the slide movement range of the slider 221. In an embodiment, the second magnetic bodies 231 may have substantially the same polarity arrangement as the first magnetic bodies 227. In the state in which the support plate 23 is in close contact with the housing 21 (e.g., the seating face 11c in FIG. 4), the second magnetic bodies 231 are disposed to correspond to the first magnetic bodies 227 so as to generate an attractive force. For example, in the state in which the support plate 23 is in close contact with the housing 21, the second magnetic bodies 231 may be mounted or disposed such that the N poles thereof may face the S poles of the first magnetic bodies 227, respectively.

In an embodiment, when the slider 221 is designed to slide by 3 mm, the N poles and the S poles of the first magnetic bodies 227 or the second magnetic bodies 231 may be alternately arranged at a 3 mm interval. For example, in the direction of movement of the slider 221, the N pole regions and the S pole regions of the first magnetic bodies 227 or the second magnetic bodies 231 may be alternately disposed, and each of the regions may be 3 mm. In this state, when the support plate 23 is in close contact with the housing 21, the first magnetic bodies 227 and the second magnetic bodies 231 may generate an attractive force in relation to each other. For example, when the support plate 23 is in close contact with the housing 21, the N poles of the second magnetic bodies 231 may be located to correspond to the N poles of the first magnetic bodies 227, respectively. Accordingly, even if the elastic member (e.g., the elastic member 221 in FIG. 19) of the hinge structure 200 provides an elastic force, the support plate 23 is capable of being maintained in the state of being in close contact with the housing 21 by the attractive force of the magnetic bodies 227 and 231.

In another embodiment, when the button 229 is manipulated, for example, when slider 221 is moved by about 3 mm by an external force in the state in which the support plate 23 is in close contact with the housing 21 and the slider 221 is moved by 3 mm by an external force, the N poles of the first magnetic bodies 227 may move to positions corresponding to the N poles of the second magnetic bodies 231, respectively. When the N poles of the first magnetic bodies 227 are located to correspond to the N poles of the second magnetic bodies 231 by the movement of the slider 221, the first magnetic bodies 227 and the second magnetic bodies 231 are capable of generating a repulsive force so as to move the support plate 23 away from the housing (e.g., the seating face 11c in FIG. 4).

The lock/unlock structure 202 as described above may maintain the support plate 23 in the state of being in close contact with the housing 21, and if necessary, may move the support plate 23 away from the housing 21. For example, the lock/unlock structure 202 described above may facilitate the use of the electronic device as well as the hinge structures 100 and 200 described above. In the electronic device according to various embodiments of the disclosure, when the hinge structure includes an elastic member (e.g., the elastic member 211 in FIG. 18 or FIG. 19), the lock/unlock structure 202 described above may be further useful.

According to various embodiments, even though the elastic member 211 provides an elastic force for moving the support plate 23 away from the housing 21, the lock/unlock structure 202 may maintain the support plate 21 in the state of being in close contact with the housing 21 using the attractive force of the magnetic bodies 227 and 231. According to an embodiment, in the state in which the support plate 23 is in close contact with the housing 21, the attractive force of the lock/unlock structure 202 and the static frictional force generated by a washer (e.g., the washer 153 in FIG. 7) may be greater than the elastic force of the elastic member 211. For example, the support plate 23 may be stably in close contact with the housing 21 in the state in which the attractive force is generated between the magnetic bodies 227 and 231 in the lock/unlock structure 202. According to another embodiment, when the lock/unlock structure 202 generates a repulsive force by the user's manipulation in the state in which the support plate 23 is in close contact with the housing 21, the support plate 23 may pivot away from the housing 21. For example, the repulsive force of the lock/unlock structure 202 and the elastic force of the elastic member 211 may be greater than the static frictional force generated by a washer (e.g., the washer 153 in FIG. 7), and the support plate 23 may pivot away from the housing 21 by the repulsive force of the lock/unlock structure 202 and the elastic force of the elastic member 211.

As described above, according to various embodiments of the disclosure, an electronic device may include:

a housing structure (e.g., the housing 11 in FIGS. 1 to 5) including a front face and a rear face facing away from the front face;

a plate (e.g., the support plate 13 in FIGS. 1 to 5) including a first face and a second face facing away from the first face and configured to be pivotally movable around a first axis (e.g., the first axis A1 in FIG. 6) between a closed state and an open state with respect to the rear face, the second face facing at least a partial region of the rear face in the closed state, and the second face forming an angle with at least the partial region of the rear face in the open state; and a hinge structure (e.g., a hinge structure 15 or 100 in FIG. 6 or FIG. 7) configured to pivotably couple the plate to the housing.

The hinge structure may include:

a first shaft (e.g., the first shaft 103a in FIG. 7) including a first straight-toothed spur gear (e.g., the first spur gear 131a in FIG. 7) rotatable around a second axis parallel to the first axis;

a second shaft (e.g., the second shaft 103b in FIG. 7) including a second straight-toothed spur gear (e.g., the second spur gear 131b in FIG. 7) rotatable around a third axis (e.g., the third axis A3 in FIG. 9) parallel to the first axis;

a third straight-toothed spur gear (e.g., the third spur gear 131c in FIG. 7) rotatable in engagement with the first spur gear;

a fourth straight-toothed spur gear (e.g., the fourth spur gear 103d in FIG. 7) rotatable in engagement with the third spur gear and the second spur gear;

a first guide structure (e.g., the first guide member 101 in FIG. 7) fixed to the housing structure, and including a first curved opening (e.g., the first curved opening 113a in FIG. 7) including a first straight-toothed inner gear (e.g., the first inner gear 113b in FIG. 7); and a second guide structure (e.g., the second guide member 102 in FIG. 7) fixed to the plate, and including a second curved opening (e.g., the second curved opening 123a in FIG. 7) including a second straight-toothed inner gear (e.g., the second inner gear 123b in FIG. 7).

The first inner gear may be engaged with the first spur gear, but may not be engaged with the second spur gear, the third spur gear, and the fourth spur gear, the second inner gear may be engaged with the second spur gear, but may not be engaged with the first spur gear, the third spur gear, and the fourth spur gear, and each of the first guide structure and the second guide structure may be rotatable around the first axis.

According to various embodiments, the first axis may be spaced apart from the rear face.

According to various embodiments, the first axis may be spaced apart from the first face and the second face.

According to various embodiments, the electronic device may further include:

a flexible layer (e.g., the flexible layer 17 in FIG. 6) attached to the first face and a remaining region of the rear face outside at least the partial region of the rear face.

According to various embodiments, the first axis may be located inside the flexible layer.

According to various embodiments, the second guide structure may include a side face oriented in a direction parallel to the first axis and facing away from the first guide structure, and the side face may further include a recess formed around one end of the second curved opening.

According to various embodiments, the hinge structure may include:

at least one washer connected to the second shaft and configured to be movable along the side face while being at least temporarily in contact with the recess.

According to various embodiments, the hinge structure may further include:

at least one pair of washers mounted side by side on the second shaft and disposed on the side face; and at least one spring washer mounted on the second shaft between the washers, and one of the washers may move along the side face of the second guide member while being in sliding contact with at least a partial region of the side face by receiving an elastic force of the spring washer.

According to various embodiments, the washer may rotate around the third axis together with the second shaft.

According to various embodiments of the disclosure, an electronic device may include:

a housing including a front face and a rear face facing away from the front face;

a support plate pivotably coupled to the rear face of the housing, the support plate being pivoted around a first axis and opened to form an angle with respect to the rear face from a position in close contact with a partial region of the rear face; and a hinge structure at least partially accommodated in the housing, and configured to pivotably couple the support plate to the housing.

The hinge structure may include:

a first guide member mounted and fixed to an inner face of the housing;

a second guide member mounted and fixed to a face of the support plate; and a gear module configured to interconnect the first guide member and the second guide member, and the first axis may be located above the rear face outside the housing.

According to various embodiments, the electronic device may further include:

a flexible layer attached to the support plate at a portion thereof and attached to another portion of the rear face at a remaining portion thereof, and the first axis may be located inside the flexible layer.

According to various embodiments, the second guide member may circle around the first axis as the support plate pivots, and when the second guide member circles around the first axis, the first guide member may circle around the first axis in a reverse direction to the second guide member.

According to various embodiments, the gear module may include:

a first inner gear formed in the first guide member;

a first spur gear including a first shaft and configured to rotate in engagement with the first inner gear;

a second spur gear including a second shaft and configured to rotate in cooperation with the first spur gear; and a second inner gear formed in the second guide member and engaged with the second spur gear.

As the support plate pivots, the second guide member may circle around the first axis together with the second inner gear so as to rotate the second spur gear, as the second spur gear rotates, the first spur gear may rotate in a reverse direction to the second spur gear, and as the first spur gear rotates, the first guide member may circle around the first axis together with the first inner gear in a reverse direction to the second guide member.

According to various embodiments, the gear module may further include:

a first opening formed to penetrate the first guide member in a direction parallel to the first axis and extending along a circular arc trajectory about the first axis; and a second opening formed to penetrate the second guide member in a direction parallel to the first axis and extending along the circular arc trajectory about the first axis, and the first inner gear may be formed on an inner wall of the first opening, and the second inner gear may be formed on an inner wall of the second opening.

According to various embodiments, the first spur gear may be disposed between the first guide member and the second guide member, and a portion of the first spur gear may extend through the first opening so as to cause a portion of the first shaft to protrude to an outer face of the first guide member, and the second spur gear may be disposed between the first guide member and the second guide member, and a portion of the second spur gear may extend through the second opening so as to cause a portion of the second shaft to protrude to an outer face of the second guide member.

According to various embodiments, the gear module may further include at least one washer mounted on the first shaft or the second shaft and in sliding contact with the outer face of the first guide member or the outer face of the second guide member.

According to various embodiments, the gear module may include:

a first module bracket disposed to face an inner face of the first guide member;

a second module bracket coupled to the first module bracket and disposed to face an inner face of the second guide member; and third and fourth spur gears rotatably mounted between the first module bracket and the second module bracket, the third and fourth spur gears being engaged with each other so as to rotate in reverse directions with respect to each other.

The first spur gear may be installed on the first module bracket and the second module bracket in the state of being rotatable in engagement with the third spur gear, and the second spur gear may be installed on the first module bracket and the second module bracket in the state of being rotatable in engagement with the fourth spur gear.

According to various embodiments, the gear module may include:

a guide groove having a circular arc trajectory formed on an inner face of the first guide member; and a guide rib having a circular arc trajectory formed on an outer face of the first module bracket.

The guide rib may be slidably engaged with the guide groove.

According to various embodiments, the hinge structure may further include:

an elastic member mounted on the first guide member to interfere with the second guide member.

In the state in which the support plate is in close contact with a partial region of the rear face, the elastic member may provide an elastic force in a direction to move the support plate away from the partial region of the rear face.

According to various embodiments, the hinge structure may further include:

a curved guide formed as a portion of the first guide member and surrounding at least a portion of the second guide member or the gear module, and the second guide member or the gear module may pivot around the first axis while moving with respect to the first guide member following guide of the curved guide.

In the foregoing detailed description, specific embodiments of the disclosure have been described. However, it will be evident to a person ordinarily skilled in the art that various modifications may be made without departing from the scope of the disclosure.

The invention claimed is:

1. An electronic device comprising:
a housing structure comprising a front face and a rear face facing away from the front face;
a plate comprising a first face and a second face facing away from the first face and configured to be pivotally movable around a first axis between a closed state and an open state with respect to the rear face, the second face facing at least a partial region of the rear face in the closed state, and the second face forming an angle with at least the partial region of the rear face in the open state; and
a hinge structure configured to pivotably couple the plate to the housing,
wherein the hinge structure comprises:
a first shaft comprising a first straight-toothed spur gear rotatable around a second axis parallel to the first axis;
a second shaft comprising a second straight-toothed spur gear rotatable around a third axis parallel to the first axis;
a third straight-toothed spur gear rotatable in engagement with the first spur gear;
a fourth straight-toothed spur gear rotatable in engagement with the third spur gear and the second spur gear;
a first guide structure fixed to the housing structure, the first guide structure comprising a first curved opening comprising a first straight-toothed inner gear; and
a second guide structure fixed to the plate, the second guide structure comprising a second curved opening comprising a second straight-toothed inner gear, and
wherein the first inner gear is engaged with the first spur gear, but is not engaged with the second spur gear, the third spur gear and the fourth spur gear,
the second inner gear is engaged with the second spur gear, but is not engaged with the first spur gear, the third spur gear and the fourth spur gear, and
each of the first guide structure and the second guide structure is rotatable around the first axis.

2. The electronic device of claim 1, wherein the first axis is spaced apart from the rear face, the first face, or the second face.

3. The electronic device of claim 1, wherein the second guide structure comprises a side face oriented in a direction parallel to the first axis and facing away from the first guide structure, and
the side face further comprises a recess formed around one end of the second curved opening.

4. The electronic device of claim 3, wherein the hinge structure further comprises at least one washer connected to the second shaft and configured to be movable along the side face while being at least temporarily in contact with the recess, and
the washer moves along the side face of the second guide member while being in sliding contact with at least a partial region of the side face.

5. An electronic device comprising:
a housing comprising a front face and a rear face facing away from the front face;
a support plate pivotably coupled to the rear face of the housing, the support plate being pivoted around a first axis and opened to form an angle with respect to the rear face from a position in close contact with a partial region of the rear face; and
a hinge structure at least partially accommodated in the housing, and configured to pivotably couple the support plate to the housing,
wherein the hinge structure comprises:
a first guide member mounted and fixed to an inner face of the housing, wherein the first guide member defines a first arced opening;
a second guide member have substantially a same shape as the first guide member, mounted and fixed to a face of the support plate, wherein the second guide member defines a second arced opening substantially aligned with the first arced opening; and
a gear module configured to interconnect the first guide member and the second guide member via the first and second arced openings, and
wherein the first axis is located above the rear face outside the housing.

6. The electronic device of claim 5, further comprising:
a flexible layer attached to the support plate at a portion thereof and attached to another portion of the rear face at a remaining portion thereof,
wherein the first axis is located inside the flexible layer.

7. The electronic device of claim 5, wherein the second guide member circles around the first axis as the support plate pivots, and
when the second guide member circles around the first axis, the first guide member circles around the first axis in a reverse direction to the second guide member.

8. The electronic device of claim 5, wherein the gear module includes:
a first inner gear formed in the first guide member;
a first spur gear comprising a first shaft and configured to rotate in engagement with the first inner gear;
a second spur gear comprising a second shaft and configured to rotate in cooperation with the first spur gear; and
a second inner gear formed in the second guide member and engaged with the second spur gear, and
wherein as the support plate pivots, the second guide member circles around the first axis together with the second inner gear so as to rotate the second spur gear,
as the second spur gear rotates, the first spur gear rotates in a reverse direction to the second spur gear, and
as the first spur gear rotates, the first guide member circles around the first axis together with the first inner gear in a reverse direction to the second guide member.

9. The electronic device of claim 8, wherein the gear module further comprises: the first arced opening formed to penetrate the first guide member in a direction parallel to the first axis and extending along a circular arc trajectory about the first axis; and the second arced opening formed to penetrate the second guide member in a direction parallel to the first axis and extending along a circular arc trajectory about the first axis, and wherein the first inner gear is formed on an inner wall of the first arced opening, and the second inner gear is formed on an inner wall of the second arced opening.

10. The electronic device of claim 9, wherein the first spur gear is disposed between the first guide member and the second guide member, and a portion of the first spur gear extends through the first arced opening so as to cause a portion of the first shaft to protrude to an outer face of the first guide member, and wherein the second spur gear is disposed between the first guide member and the second guide member, and a portion of the second spur gear extends through the second arced opening so as to cause a portion of the second shaft to protrude to an outer face of the second guide member.

11. The electronic device of claim 10, wherein the gear module further comprises:
at least one washer mounted on the first shaft or the second shaft and in sliding contact with the outer face of the first guide member or the outer face of the second guide member.

12. The electronic device of claim 8, wherein the gear module comprises:
a first module bracket disposed to face an inner face of the first guide member;
a second module bracket coupled to the first module bracket and disposed to face an inner face of the second guide member; and
third and fourth spur gears rotatably mounted between the first module bracket and the second module bracket, the third and fourth spur gears being engaged with each other so as to rotate in reverse directions with respect to each other,
wherein the first spur gear is installed on the first module bracket and the second module bracket in a state of being rotatable in engagement with the third spur gear, and
wherein the second spur gear is installed on the first module bracket and the second module bracket in a state of being rotatable in engagement with the fourth spur gear.

13. The electronic device of claim 12, wherein the gear module further comprises:
a guide groove having a circular arc trajectory formed on the inner face of the first guide member; and
a guide rib having a circular arc trajectory formed on the outer face of the first module bracket, and
wherein the guide rib is slidably engaged with the guide groove.

14. The electronic device of claim 5, wherein the hinge structure further comprises an elastic member mounted on the first guide member to interfere with the second guide member, and
wherein in a state in which the support plate is in close contact with a partial region of the rear face, the elastic member provides an elastic force in a direction to move the support plate away from the partial region of the rear face.

15. The electronic device of claim 5, wherein the hinge structure further comprises a curved guide formed as a portion of the first guide member and surrounding at least a portion of the second guide member or the gear module, and
the second guide member or the gear module pivots around the first axis while moving with respect to the first guide member following guide of the curved guide.

* * * * *